US011655264B2

(12) United States Patent
Wei et al.

(10) Patent No.: US 11,655,264 B2
(45) Date of Patent: May 23, 2023

(54) METALLOCENE COMPOUNDS, AND PREPARATION AND USE THEREOF FOR SYNTHESIS OF POLY-ALPHA-OLEFINS AS LUBRICATING BASE OIL

(71) Applicant: APALENE TECHNOLOGY CO., LTD. (JIAXING), Jiaxing (CN)

(72) Inventors: Dongchu Wei, Jiaxing (CN); Bing Li, Jiaxing (CN)

( * ) Notice: Subject to any disclaimer, the term of this patent is extended or adjusted under 35 U.S.C. 154(b) by 0 days.

(21) Appl. No.: 15/932,858

(22) Filed: May 9, 2018

(65) Prior Publication Data

US 2018/0258112 A1    Sep. 13, 2018

Related U.S. Application Data

(63) Continuation-in-part of application No. PCT/CN2016/000227, filed on Apr. 27, 2016.

(30) Foreign Application Priority Data

Nov. 25, 2015 (CN) .......................... 201510830726.2
Jan. 22, 2016 (CN) .......................... 201610044896.2

(51) Int. Cl.
| | | |
|---|---|---|
| C07F 7/00 | (2006.01) |
| C07F 7/28 | (2006.01) |
| C08F 10/00 | (2006.01) |
| C08F 4/6592 | (2006.01) |
| C07F 17/00 | (2006.01) |
| C10M 107/10 | (2006.01) |
| C07F 7/08 | (2006.01) |
| C07F 7/10 | (2006.01) |
| C08F 4/659 | (2006.01) |
| C10N 20/02 | (2006.01) |
| C10N 20/00 | (2006.01) |
| C10N 70/00 | (2006.01) |
| C08F 10/14 | (2006.01) |

(52) U.S. Cl.
CPC .................. *C07F 7/28* (2013.01); *C07F 7/00* (2013.01); *C07F 7/0803* (2013.01); *C07F 7/10* (2013.01); *C07F 17/00* (2013.01); *C08F 4/6592* (2013.01); *C08F 10/00* (2013.01); *C10M 107/10* (2013.01); *C08F 4/65908* (2013.01); *C08F 4/65912* (2013.01); *C08F 10/14* (2013.01); *C08F 2420/02* (2013.01); *C10M 2205/0285* (2013.01); *C10N 2020/011* (2020.05); *C10N 2020/02* (2013.01); *C10N 2070/00* (2013.01)

(58) Field of Classification Search
CPC .................. C07F 7/28; C07F 7/00; C07F 7/02
USPC .................................................. 546/10; 549/3
See application file for complete search history.

(56) References Cited

U.S. PATENT DOCUMENTS 6,469,188 B1 *  10/2002  Miller .................. B01J 31/2295
                                                        502/103

* cited by examiner

*Primary Examiner* — Charanjit Aulakh
(74) *Attorney, Agent, or Firm* — Panterrain IP Law; Charles Liu

(57) ABSTRACT

The present invention relates to a metallocene compound, and preparation and use thereof, and the compound can be used as a catalyst for synthesis of poly-α-olefin as lubricating base oil. The metallocene compound includes a substituted aryl group, a bridged atom, an optionally unsubstituted, 3-mono-substituted or 3,6-disubstituted 5H-indeno [1,2-b] pyridyl group or optionally unsubstituted, 3-mono-substituted or 3,6-disubstituted 5H-indeno [1,2-b] thiopyranyl group, and a metal coordination group. As a catalyst, the metallocene compound is shown to be structurally stable and high in catalytic efficiency, and the preparation of the catalyst is relatively easy in operation, high in yield, low in cost, low in pollution and easy to scale up for industrial production.

4 Claims, No Drawings

METALLOCENE COMPOUNDS, AND PREPARATION AND USE THEREOF FOR SYNTHESIS OF POLY-ALPHA-OLEFINS AS LUBRICATING BASE OIL

FIELD OF THE INVENTION

The present invention relates to a metallocene compound, preparation and use thereof for synthesis of poly-α-olefin as lubricating base oil.

BACKGROUND OF THE INVENTION

Polyolefins Synthetic Oil (PAO) is an excellent lubricating base oil and is one of the most widely used base oils for the synthesis of engine oils, gear oils and other industrial oils. The oil has greatly expanded the range of applications of lubricating greases under harsh conditions such as high temperature, low temperature, high loads. PAO can provide excellent viscosity-temperature performance, thermal oxidation stability, lubrication and abrasion resistance and cleanliness, and thus can greatly extend Oil change period, slow down equipment corrosion and wear, reduce equipment maintenance cycle, greatly improve utilization of equipment and service life, and provide for the users with benefits on costs, environmental protection and energy conservation. Thus, PAO has been selected as base oil for lubricating oils for high grade lubricants.

ExxonMobil is one of the world's leading companies producing poly-α-olefins. In May 2010, a new generation of highly viscous poly-alpha-olefins, SpectraSyn Elite, synthesized using a metallocene catalyst synthesis process, was introduced to be distinguished from conventional PAO. Such new PAO base oil is called mPAO. In general, PAO molecules have prominent roots, from the backbone in a disordered manner to extend the length of the side chain. Its molecular structure can be summarized as shown in the figure below. The mPAO uses metallocene catalyst synthesis process, metallocene is a single active center catalyst, its unique geometric structure can be a very uniform chemical products, so mPAO has a comb structure, no vertical side chain. This shape has improved rheological properties and flow characteristics compared to conventional PAO, so that better shear stability, lower pour point and higher viscosity index can be better provided, especially since there are fewer side chains and has a much higher shear stability than conventional PAO. These features determine the use of mPAO targets for high-critical applications, including powertrain and gear oils, compressor lubricants, transmission fluids and industrial lubricants.

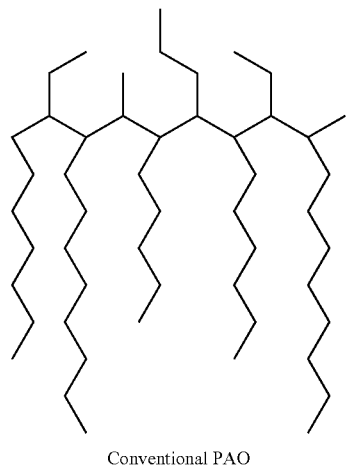
Conventional PAO

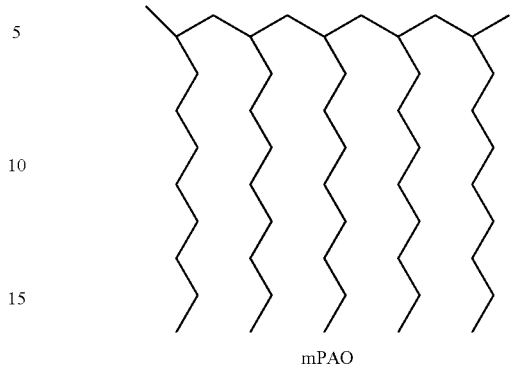
mPAO

Foreign related mPAO synthesis and development started earlier, the world's major companies such as Mobil, Kodo and BP have their own patents, Mobil, Chevron and Japan have recently achieved the industrialization of industrial production and to market. Their own products are as shown in Table 1.

The PAO synthesis has been in a backward situation in China. In recent years, Shanghai Nake and Fu Ke Shi completed the independent intellectual property rights of PAO synthesis technology research and development and related products. But the research and development of mPAO has little relevant research and reports, the current research and development in this area is basically blank.

The properties of poly-α-olefin synthetic oils are largely determined by their synthetic catalysts and synthetic processes, in addition to those associated with polymeric feedstocks. At present, the mainstream PAO product synthesis mostly non-single active center catalyst, the product structure is not complete, so compared with the single active center metallocene catalyst synthesis products, viscosity and temperature performance on a certain gap. There are two main types of metallocene catalysts for the synthesis of mPAO: non-bridged metallocene catalysts and bridged metallocene catalysts. The products synthesized with non-bridged metallocene catalysts are low viscosity PAO, while PAO with medium and high viscosity is obtained by using bridged metallocene catalyst.

SUMMARY OF THE INVENTION

The present invention provided a metallocene compound, preparation and use thereof. The compound can be used as a catalyst for synthesis of poly-α-olefin as lubricating base oil.

In one aspect, the invention provided a metallocene compound. The metallocene compound comprises a substituted aryl group, a bridged atom, an unsubstituted, 3-mono-substituted or 3,6-disubstituted 5H-indeno [1,2-b] pyridyl group or unsubstituted, 3-mono-substituted or 3,6-disubstituted 5H-indeno [1,2-b] thiopyranyl group, and a metal coordination group, and the catalyst has a formula of:

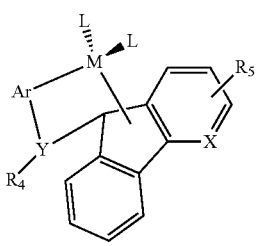

wherein:
the aryl group is

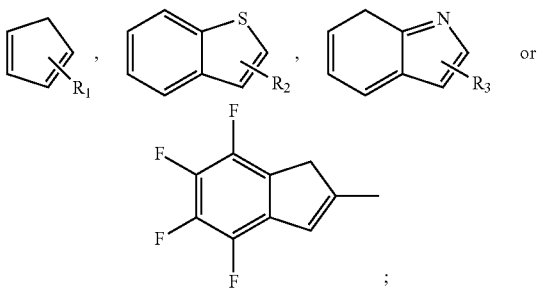

X is nitrogen or sulfur;
Y is silicon or carbon as a bridging atom;
$R_1$ is fluorine or hydrogen on cyclopentadienyl group;
$R_2$ is fluorine or hydrogen on benzothiophenyl group;
$R_3$ is fluorine or hydrogen on indoly group;
$R_4$ is a substituent on a bridge, being a cyclohexyl, cyclopentyl, or cyclobutyl when bridging atom is silicon, and being 1,3,5-trisubstituted or mono-substituted or di-substituted phenyl when the bridging atom is carbon;
$R_5$ is halogen, or a straight-chain or branched alkyl with 2 to 24 carbon atoms on 3-mono-substituted or 3,6-disubstituted 5H-indeno [1,2-b] pyridyl or 3-mono-substituted or 3,6-disubstituted 5H-indeno [1,2-b] thiopyranyl;
M is metal of hafnium or titanium;
L is a halogen as a ligand coordinated to metal.
L is a halogen coordinated to the metal, and the number of the halogen coordination may vary with the value of the metal.

In some embodiments, the metallocene compound is provided, wherein:
i) the 5H-indeno [1,2-b] pyridyl is selected from the group consisting of: 5H-indeno [1,2-b] pyridyl, 3-fluoro 5H-indeno [1,2-b] pyridyl, 3,6-dibromo-5H-indeno [1,2-b] pyridyl, 3-iodo-5H-indeno [1,2-b] pyridyl, 3,6-diiodo 5H-indeno [1,2-b] pyridyl, 3-ethyl 5H-indeno [1,2-b] pyridyl, 3,6-diethyl 5H-indeno [1,2-b] pyridyl, 3-propyl 5H-indeno [1,2-b] pyridyl, 3,6-dipropyl 5H-indeno [1,2-b] pyridyl, 3-butyl 5H-indeno [1,2-b] pyridyl, 3,6-dibutyl 5H-indeno [1,2-b] pyridyl, 3-isopropyl 5H-indeno [1,2-b] pyridyl, 3,6-diisopropyl 5H-indeno [1,2-b] pyridyl, 3-isobutyl 5H-indeno [1,2-b] pyridyl, 3,6-diisobutyl 5H-indeno [1,2-b] pyridyl, 3-pentyl 5H-indeno [1,2-b] pyridyl, 3,6-dipentyl 5H-indeno [1,2-b] pyridyl, 3-isopentyl 5H-indeno [1,2-b] pyridyl, 3,6-diisopentyl 5H-indeno [1,2-b] pyridyl, 3-tert-butyl 5H-indeno [1,2-b] pyridyl, 3,6-di-tert-butyl 5H-indeno [1,2-b] pyridyl, 3-allyl 5H-indeno [1,2-b] pyridyl, 3,6-diallyl 5H-indeno [1,2-b] pyridyl, 3-hexyl 5H-indeno [1,2-b] pyridyl, 3,6-dihexyl 5H-indeno [1,2-b] pyridyl, 3-isohexyl 5H-indeno [1,2-b] pyridyl, 3,6-diisohexyl 5H-indeno [1,2-b] pyridyl, 3-tert-butyl ethyl 5H-indeno [1,2-b] pyridyl, 3,6-di-t-butyl ethyl 5H-indeno [1,2-b] pyridyl, 3-heptyl 5H-indeno [1,2-b] pyridyl, 3,6-diheptyl 5H-indeno [1,2-b] pyridyl, 3-isoheptyl 5H-indeno [1,2-b] pyridyl, 3,6-diisoheptyl 5H-indeno [1,2-b] pyridyl, 3-tert-butyl propyl 5H-indeno [1,2-b] pyridyl, 3,6-di tert-butyl propyl 5H-indeno [1,2-b] pyridyl, 3-octyl 5H-indeno [1,2-b] pyridyl, 3,6-dioctyl 5H-indeno [1,2-b] pyridyl, 3-isooctyl 5H-indeno [1,2-b] pyridyl, 3,6-diisooctyl 5H-indeno [1,2-b] pyridyl, tert-butylbutyl-5H-indeno [1,2-b] pyridyl, 3,6-di-tert-butylbutyl 5H-indeno [1,2-b] pyridyl, 3-undecyl 5H-indeno [1,2-b] pyridyl, 3,6-di-undecyl 5H-indeno [1,2-b] pyridyl, 3-dodecyl 5H-indeno [1,2-b] pyridyl, 3,6-di-dodecyl 5H-indeno [1,2-b] pyridyl, 3-tridecyl 5H-indeno [1,2-b] pyridyl, 3,6-di-tridecyl 5H-indeno [1,2-b] pyridyl, 3-tetradecyl 5H-indeno [1,2-b] pyridyl, 3,6-di-tetradecyl 5H-indeno [1,2-b] pyridyl, 3-pentadecyl 5H-indeno [1,2-b] pyridyl, 3,6-di-pentadecyl 5H-indeno [1,2-b] pyridyl, 3-hexadecyl 5H-indeno [1,2-b] pyridyl, 3,6-di-hexadecyl 5H-indeno [1,2-b] pyridyl, 3-heptadecyl 5H-indeno [1,2-b] pyridyl, 3,6-di-heptadecyl 5H-indeno [1,2-b] pyridyl, 3-octadecyl 5H-indeno [1,2-b] pyridyl, 3,6-di-octadecyl 5H-indeno [1,2-b] pyridyl, 3-n-hexadecyl 5-indeno [1,2-b] pyridyl, 3,6-di-n-hexadecyl 5H-indeno [1,2-b] pyridyl, 3-eicosyl 5H-indeno [1,2-b] pyridyl, 3,6-di-eicosyl 5H-indeno [1,2-b] pyridyl, 3-docosyl 5H-indeno [1,2-b] pyridyl, 3,5-di docosyl 5H-indeno [1,2-b] pyridyl, 3-dodecyl 5H-indeno [1,2-b] pyridyl, 3,6-di-dodecyl 5H-indeno [1,2-b] pyridyl, 3-tridecyl 5H-indeno [1,2-b] pyridyl, 3,6-di-trialkyl 5H-indeno [1,2-b] pyridyl, 3-tetracosyl 5H-indeno [1,2-b] pyridyl, 3,6-di-tetracosyl 5H-indeno [1,2-b] pyridyl;

2) the 5H-indeno [1,2-b] thiopyranyl is selected from the group consisting of: 5H-indeno [1,2-b] thiopyranyl, 3-fluoro-5H-indeno [1,2-b] thiopyranyl, 3,6-difluoro 5H-indeno [1,2-b] thiopyranyl, 3-bromo-5H-indeno [1,2-b] thiopyranyl, 3,6-dibromo-5H-indeno [1,2-b] thiopyranyl, 3-iodo-5H-indeno [1,2-b] thiopyranyl, 3,6-diiodo-5H-indeno [1,2-b] thiopyranyl, 3-ethyl 5H-indeno [1,2-b] thiopyranyl, 3,6-diethyl 5H-indeno [1,2-b] thiopyranyl, 3-propyl 5H-indeno [1,2-b] thiopyranyl, 3,6-dipropyl 5H-indeno [1,2-b] thiopyranyl, 3-butyl 5H-indeno [1,2-b] thiopyranyl, 3,6-dibutyl 5H-indeno [1,2-b] thiopyranyl, 3-isopropyl 5H-indeno [1,2-b] thiopyranyl, 3,6-diisopropyl 5H-indeno [1,2-b] thiopyranyl, 3-isobutyl 5H-indeno [1,2-b] thiopyranyl, 3,6-diisobutyl 5H-indeno [1,2-b] thiopyranyl, 3-pentyl 5H-indeno [1,2-b] thiopyranyl, 3,6-dipentyl 5H-indeno [1,2-b] thiopyranyl, 3-isopentyl 5H-indeno [1,2-b] thiopyranyl, 3,6-diisopentyl 5H-indeno [1,2-b] thiopyranyl, 3-tert-butyl 5H-indeno [1,2-b] thiopyranyl, 3,6-di-tert-butyl 5H-indeno [1,2-b] thiopyranyl, 3-allyl 5H-indeno [1,2-b] thiopyranyl, 3,6-diallyl 5H-indeno [1,2-b] thiopyranyl, 3-hexyl 5H-indeno [1,2-b] thiopyranyl, 3,6-dihexyl 5H-indeno [1,2-b] thiopyranyl, 3-isohexyl 5H-indeno [1,2-b] thiopyranyl, 3,6-diisohexyl 5H-indeno [1,2-b] thiopyranyl, 3-tert-butylethyl 5H-indeno [1,2-b] thiopyranyl, 3,6-di-tert-butylethyl 5H-indeno [1,2-b] thiopyranyl, 3-heptyl 5H-indeno [1,2-b] thiopyranyl, 3,6-di-heptyl 5H-indeno [1,2-b] thiopyranyl, 3-isoheptyl 5H-indeno [1,2-b] thiopyranyl, 3,6-di-isoheptyl 5H-indeno [1,2-b] thiopyranyl, 3-tert-butylpropyl 5H-indeno [1,2-b] thiopyranyl, 3,6-di-tert-butylpropyl-5H-indeno [1,2-b] thiopyranyl, 3-octyl 5H-indeno [1,2-b] thiopyranyl, 3,6-dioctyl 5H-Indeno [1,2-b] thiopyranyl, 3-isooctyl 5H-indeno [1,2-b] thiopyranyl, 3,6-diisooctyl 5H-indeno [1,2-b] thiopyranyl, 3-tert-butylbutyl 5H-indeno [1,2-b] thiopyranyl, 3,6-di-tert-butylbutyl 5H-indeno [1,2-b] thiopyranyl, 3-undecyl 5H-indeno [1,2-b] thiopyranyl, 3,6-di-undecyl 5H-indeno [1,2-b] thiopyranyl, 3-dodecyl 5H-indeno [1,2-b]

thiopyranyl, 3,6-di-dodecyl 5H-indeno [1,2-b] thiopyranyl, 3-tridecyl 5H-indeno [1,2-b] thiopyranyl, 3,6-di-tridecyl 5H-indeno [1,2-b] thiopyranyl, 3-tetradecyl 5H-indeno [1,2-b] thiopyranyl, 3,6-di-tetradecyl 5H-indeno [1,2-b] thiopyranyl, 3-pentadecyl 5H-indeno [1,2-b] thiopyranyl, 3,6-di-pentadecyl 5H-indeno [1,2-b] thiopyranyl, 3-hexadecyl 5H-indeno [1,2-b] thiopyranyl, 3,6-dihexadecyl 5H-indeno [1,2-b] thiopyranyl, 3-heptadecyl 5H-indeno [1,2-b] thiopyranyl, 3,6-di-heptadecyl 5H-indeno [1,2-b] thiopyranyl, 3-octadecyl 5H-indeno [1,2-b] thiopyranyl, 3,6-di-octadecyl 5H-indeno [1,2-b] thiopyranyl, 3-nonadecyl 5H-indeno [1,2-b] thiopyranyl, 3,6-di-nonadecyl 5H-indeno [1,2-b] thiopyranyl, 3-eicosyl 5H-indeno [1,2-b] thiopyranyl, 3,6-di-eicosyl 5H-indeno [1,2-b] thiopyranyl, 3-heneicosyl 5H-indeno [1,2-b] thiopyranyl, 3,6-di-heneicosyl 5H-indeno [1,2-b] thiopyranyl, 3-docosyl 5H-indeno [1,2-b] thiopyranyl, 3,6-di-octadecyl 5H-indeno [1,2-b] thiopyranyl, 3-docosyl 5H-indeno [1,2-b] thiopyranyl, 3,6-di-docosyl 5H-indeno [1,2-b] thiopyranyl, 3-tridecyl 5H-indeno [1,2-b] thiopyranyl, 3,6-di-tridecyl 5H-indeno [1,2-b] thiopyranyl, 3-tetracosyl 5H-indeno [1,2-b] thiopyranyl, 3,6-di-tetracosyl 5H-indeno [1,2-b] thiopyranyl.

In some preferred embodiments, the metallocene compound comprises 5H-indeno [1,2-b] pyridyl group, wherein the metallocene catalyst is selected from the group consisting of:

5H-indeno [1,2-b] pyridyl-2-fluorocyclopentadienyl-bis-1,3,5-trifluorophenyl-zirconium dichloride;
5H-indeno [1,2-b] pyridyl-2-fluorocyclopentadienyl-bis-1,3,5-trifluorophenyl-titanium dichloride;
5H-indeno[1,2-b]pyridyl-2-fluorocyclopentadienyl-bis-1,3,5-trifluorophenyl-hafnium-dihalide;
5H-indeno [1,2-b] pyridyl-2-fluorocyclopentadienyl-cyclohexylsilyl-zirconium dichloride;
5H-indeno [1,2-b] pyridyl-2-fluorocyclopentadienyl-cyclohexylsilyl-titanium dichloride; and
5H-indeno [1,2-b] pyridyl-2-fluorocyclopentadienyl-cyclohexylsilyl-hafnium dichloride.

In some preferred embodiments, the metallocene compound comprises 5H-indeno [1,2-b] thiopyranyl group, wherein the metallocene compound is selected from the group consisting of:

5H-indeno [1,2-b] thiopyranyl-2-fluorocyclopentadienyl-bis-1,3,5-trifluorophenyl-zirconium dichloride;
5H-indeno [1,2-b] thiopyranyl-2-fluorocyclopentadienyl-bis-1,3,5-trifluorophenyl-titanium dichloride;
5H-indeno[1,2-b] thiopyranyl-2-fluorocyclopentadienyl-bis-1,3,5-trifluorophenyl-hafnium-dihalide;
5H-indeno [1,2-b] thiopyranyl-2-fluorocyclopentadienyl-cyclohexylsilyl-zirconium dichloride;
5H-indeno [1,2-b] thiopyranyl-2-fluorocyclopentadienyl-cyclohexylsilyl-titanium dichloride; and
5H-indeno [1,2-b] thiopyranyl-2-fluorocyclopentadienyl-cyclohexylsilyl-hafnium dichloride.

In another aspect, the invention provided a method of use of the metallocene compound. The method comprises using the metallocene compound for synthesis of poly-α-olefin as lubricating base oil, and adding the metallocene compound in an amount of 0.1 to 10 ppm wt % of total reactants.

In another aspect, the invention provided a method of manufacture of the metallocene compound, the method comprising the steps of:

(1) preparing an unsubstituted, 3-mono-substituted or 3,6-disubstituted 5H-indeno [1,2-b] pyridyl, or an unsubstituted, 3-mono-substituted or 3,6-disubstituted 5H-indeno [1,2-b] thiopyranyl;

(2) preparing substituted cyclopentadienyl, benzothienyl, and indolyl, and 2,3,4,5-tetrafluoro-1-methylindenyl as reagents;

(3) preparing a coordinated lithium salt of the reagents from step (2) with the 5H-indeno [1,2-b] pyridyl or the 5H-indeno [1,2-b] thiopyranyl;

(4) preparing a metal complex with a bridged substituent, and having an ether solution of coordinated lithium salt of step (3) reacted with the metal complex to give a product of metallocene compound.

The method of manufacture of the metallocene compound may further comprise:

the step (3), when the 5H-indeno [1,2-b] pyridyl is used, further comprising:

a) 5H-indeno [1,2-b] pyridyl and cyclopentadienyl: 5H-indeno [1,2-b] pyridyl was dissolved in diethyl ether and mixed with n-butyllithium in hexane, and stirred for several hours; adding an equimolar of substituted cyclopentadienyl, and then stirred for at least 12 hours; resulting mixture was hydrolyzed with water, the organic phase was dried and the solvent was evaporated; resulting material was purified, filtered and crystallized to give a ligand of 5H-indeno [1,2-b] pyridyl and cyclopentadienyl;

b) 5H-indeno [1,2-b] pyridyl and benzothienyl: 5H-indeno [1,2-b] pyridyl was dissolved in diethyl ether and mixed with n-butyllithium in hexane, and stirred for several hours; adding an equimolar of benzothienyl, and then stirred for at least 12 hours; resulting mixture was hydrolyzed with water, the organic phase was dried and the solvent was evaporated; resulting material was purified, filtered and crystallized to give a ligand of 5H-indeno [1,2-b] pyridyl and benzothienyl;

c) 5H-indeno [1,2-b] pyridyl and indolyl: 5H-indeno [1,2-b] pyridyl was dissolved in diethyl ether and mixed with n-butyllithium in hexane, and stirred for several hours; adding an equimolar of indolyl, and then stirred for at least 12 hours; resulting mixture was hydrolyzed with water, the organic phase was dried and the solvent was evaporated; resulting material was purified, filtered and crystallized to give a ligand of 5H-indeno [1,2-b] pyridyl and indolyl;

d) 5H-indeno [1,2-b] pyridyl and 2,3,4,5-tetrafluoro-1-methylindenyl: 5H-indeno [1,2-b] pyridyl was dissolved in diethyl ether and mixed with n-butyllithium in hexane, and stirred for several hours; adding an equimolar of 2,3,4,5-tetrafluoro-1-methylindenyl, and then stirred for at least 12 hours; resulting mixture was hydrolyzed with water, the organic phase was dried and the solvent was evaporated; resulting material was purified, filtered and crystallized to give a ligand of 5H-indeno [1,2-b] pyridyl and 2,3,4,5-tetrafluoro-1-methylindenyl.

In other embodiments, the method of manufacture of the metallocene compound may further comprise:

the step (3), when the 5H-indeno [1,2-b] thiopyranyl is used, further comprising:

a) 5H-indeno [1,2-b] thiopyranyl and cyclopentadienyl: 5H-indeno [1,2-b] thiopyranyl was dissolved in ether and mixed with n-butyllithium in hexane, and stirred for several hours; adding an equimolar of substituted cyclopentadienyl, and then stirred for at least 12 hours; resulting mixture was hydrolyzed with water, the organic phase was dried and the solvent was evaporated; resulting material was purified, filtered and crystallized to give a ligand of 5H-indeno [1,2-b] thiopyranyl and cyclopentadienyl;

b) 5H-indeno [1,2-b] thiopyranyl and benzothienyl: 5H-indeno [1,2-b] thiopyranyl was dissolved in ether and mixed with n-butyllithium in hexane, and stirred for several hours; adding an equimolar of benzothienyl, and then stirred for at least 12 hours; resulting mixture was hydrolyzed with water, the organic phase was dried and the solvent was evaporated; resulting material was purified, filtered and crystallized to give a ligand of 5H-indeno [1,2-b] thiopyranyl and benzothienyl;

c) 5H-indeno [1,2-b] thiopyranyl and indolyl: 5H-indeno [1,2-b] thiopyranyl was dissolved in ether and mixed with n-butyllithium in hexane, and stirred for several hours; adding an equimolar of indolyl, and then stirred for at least 12 hours; resulting mixture was hydrolyzed with water, the organic phase was dried and the solvent was evaporated; resulting material was purified, filtered and crystallized to give a ligand of 5H-indeno [1,2-b] thiopyranyl and indolyl;

5H-indeno [1,2-b] thiopyranyl and 2,3,4,5-tetrafluoro-1-methylindenyl: 5H-indeno [1,2-b] thiopyranyl was dissolved in ether and mixed with n-butyllithium in hexane, and stirred for several hours; adding an equimolar of 2,3,4,5-tetrafluoro-1-methylindenyl, and then stirred for at least 12 hours; resulting mixture was hydrolyzed with water, the organic phase was dried and the solvent was evaporated; resulting material was purified, filtered and crystallized to give a ligand of 5H-indeno [1,2-b] thiopyranyl and 2,3,4,5-tetrafluoro-1-methylindenyl.

In other embodiments, the method of manufacture of the metallocene compound may further comprise in the step (4): dissolving a cyclic silyl ether halide or a substituted phenyl halide in diethyl ether, adding dropwise with n-butyllithium, adding dropwise with metal halide, stirring for at least 12 hours, and adding the lithium salt of step (3), and then resulting material was purified, filtered and crystallized to give a product metallocene compound.

The metallocene compound of the present invention can be used as a catalyst for the synthesis of a lubricating base oil, and the reaction amount of which is 0.1 to 10 ppm wt %, preferably 0.2 ppm wt %, 1.3 ppm wt %, 1.5 ppm wt %, 1.8 ppm wt %, 2.0 ppm wt %, 2.3 ppm wt %, 2.5 ppm wt %, 3.0 ppm wt %, 4 ppm wt %, 5 ppm wt %, 6 ppm wt %, 7 ppm wt %, 8 ppm wt %, 9 ppm wt % or 10 ppm wt %.

The present invention relates to a metallocene catalyst for synthesis of poly-α-olefin as lubricating base oil. The catalyst includes a substituted aryl group, a bridged atom, an optionally unsubstituted, 3-mono-substituted or 3,6-disubstituted 5H-indeno [1,2-b] pyridyl group or optionally unsubstituted, 3-mono-substituted or 3,6-disubstituted 5H-indeno [1,2-b] thiopyranyl group, and a metal coordination group. The catalyst is shown to be structurally stable and high in catalytic efficiency, and the preparation of the catalyst is relatively easy in operation, high in yield, low in cost, low in pollution and easy to scale up for industrial production.

DETAILED DESCRIPTION OF THE EMBODIMENTS

Example 1

3-Fluoro Substituted Fluorene as a Ligand Carbon Bridged Zirconium Metal Catalyst (1) Synthesis of 3-Fluoro-Substituted The mixture of 9-fluorenone (1.8 g, 10 mmol) and water (70 mL) was added to the reactor, stirred and heated. When the temperature rose to 80-90° C., the mixed acid of nitric acid and sulfuric acid 4:7), refluxed for 2.5-4 h, quenched with water, filtered, and the resulting solid was recrystallized from methanol and glacial acetic acid to give 3-nitro-9-fluorenone (1.87 g, 83%). Feature: $^1$H NMR (CHCl$_3$ d$^3$) δppm: 8.44 (m, 1H, Aromatic ring H) 8.34 (m, 1H, Aromatic ring H), 8.22 (s, 1H, Aromatic ring H), 7.70 (m, 1H, Aromatic ring H), 7.51 (m, 1H, Aromatic ring H), 7.24 (d, 1H, Aromatic ring H), 7.05 (d, 1H, Aromatic ring H).

3-nitro-9-fluorenone (1.87 g) and ethanol were added to the reactor at a weight ratio of 1:50. The iron powder (465 mg) was added and stirred and refluxed. The reaction was carried out overnight. TLC was used to detect the nitro compound has disappeared. After cooling, remove the solid by filtration and evaporate the solution. Add 100 mL of ethyl acetate to dissolve, organic phase with saturated saline 100 mL wash 3 times, combined organic phase, desiccant drying and then evaporated to dry. Recrystallization from ethyl acetate petroleum ether gave 3-amino-9-fluorenone as a pale yellow solid (1.54 g, 95%) with a purity of greater than 97%. Feature: $^1$H NMR (CHCl$_3$ d$^3$) δppm: 8.44 (m, 1H, Aromatic ring H) 8.34 (m, 1H, Aromatic ring H), 7.70 (m, 1H, Aromatic ring H), 7.59 (m, 1H, Aromatic ring H), 7.51 (m, 1H, Aromatic ring H), 6.99 (s, 1H, Aromatic ring H), 6.42 (m, 1H, Aromatic ring H), 6.27 (m, 2H, NH$_2$).

A mixture of 3-amino-9-fluorenone (1.54 g) and 50 mL of 37% concentrated hydrochloric acid was cooled to 0 to 5° C. and 30 mL of a 35% aqueous solution of sodium nitrite was added with stirring to keep the temperature at 0 to 5° C. The reaction is 1~1.5 hours. And then slowly dropping 40% of fluoroboric acid 20 mL, drop in the process of increasing the viscosity, after the addition of 15 minutes after mixing, filtration, drying, and then drying. The diazonium fluoroborate was poured into another dry four-necked flask, subjected to a lysis reaction, slowly heated, and after 50 V began to smoke white smoke, the electric kettle was removed, and the temperature was again heated at about 130 V The reaction time is the longest and finally heated to 200° C. until no oil is distilled off and then steam distilled.

The layers were separated and the aqueous layer was extracted twice with 30 ml of toluene. The organic layers were combined and distilled under reduced pressure until no solvent was distilled off. The mass fraction of 3-fluoro-9-fluorenone was determined by gas chromatography area normalization 99.6%, the yield of 80.5%.

The product was 3-fluoro-9-fluorenone 1.25 g. Feature: $^1$H NMR (CHCl$_3$ d$^3$) δppm: 8.44 (m, 1H, Aromatic ring H) 8.34 (m, 1H, Aromatic ring H), 7.82 (m, 1H, Aromatic ring H), 7.70 (m, 1H, Aromatic ring H), 7.62 (m, 1H, Aromatic ring H), 7.51 (m, 1H, Aromatic ring H), 7.30 (s, 1H, Aromatic ring H).

Mix 615 mg of zinc powder, 300 mg of mercuric chloride, 10 ml of concentrated hydrochloric acid and 40 ml of water for 5 min, add 40 ml of 95% ethanol, add 1.25 g of 3-fluoro-9-fluorenone, reflux reaction 8 h, the reaction process by adding 30 ml of concentrated hydrochloric acid, hardened, cooled, The product was recrystallized from ethanol and dried to give 0.93 g of 3-fluoro-substituted fluorene as a white solid.

Feature: $^1$H NMR (CHCl$_3$ d$^3$) δppm: 7.55 (m, 3H, Aromatic ring H) 7.87 (m, 1H, Aromatic ring H), 7.38 (m, 2H, Aromatic ring H), 6.99 (m, 1H, Aromatic ring H), 4.12 (m, 2H, CH$_2$).

(2) Synthesis of 2-fluorocyclopentadienyl: 10 mmol of sodium was added to 10 ml of ethanol. Then add 10 mmol of toluene ketone. Then 20 mmol of 2-fluorocyclopentadiene was added dropwise and the mixture was stirred under reflux for 15 hours. The resulting product was then diluted with water and extracted with pentane. The organic phase was distilled off, the excess 2-fluorocyclopentadienyl group was distilled off, extracted with ethyl acetate, dried, and evaporated to dryness.

(3) 10 mmol of 3-fluorofluorene was dissolved in 50 ml of diethyl ether and mixed with 10 mmol of n-butyllithium in 1.6 M hexane and stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(4) 20 mmol of 1,3,5-trifluorobenzene was dissolved in 50 mL of ether and cooled to −78° C. 20 mmol of butyllithium was added dropwise. After adding 1 eq of zirconium tetrachloride, the mixture was stirred overnight, A 10 mmol ligand was added dropwise to a mixture of 30 ml of ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum.

For purification, the residue was dissolved in pentane and the solution was filtered through silica gel and crystallized at −30° C. to give the corresponding 3-fluorofluorene-2-fluorocyclopentadiene-di-1,3,5-trifluoride Phenyl-zirconium dichloride. Feature: $^1$H NMR (DMSO d$^6$) δppm: 7.87 (m, 1H, Aromatic ring H) 7.55 (m, 3H, Aromatic ring H), 7.38 (m, 1H, Aromatic ring H), 7.28 (m, 1H, Aromatic ring H), 6.99 (m, 1H, Aromatic ring H), 6.40 (m, 4H, Aromatic ring H), 6.21 (m, 1H, Cyclopentadiene H), 6.10 (m, 1H, Cyclopentadiene H), 4.66 (m, 2H, Aromatic ring H), 2.90 (m, 2H, Cyclopentadiene H).

Example 2

3,6-difluoro-Substituted Fluorene as a Ligand Carbon-Bridged Zirconium Metal Catalyst (1) Synthesis of 3,6-difluoro-fluorene
(1.8 g, 10 mmol) and water were added to the reactor at a weight ratio of 1:7, stirred and heated. When the temperature rose to 80-90° C., the mixed acid of nitric acid and sulfuric acid And sulfuric acid 8:2), refluxed for 20 hours, quenched with water, filtered, and the resulting solid was recrystallized from methanol and glacial acetic acid to give 3,6-dinitro-9-fluorenone (1.35 G, 50%). Feature: $^1$H NMR (CHCl$_3$ d$^3$) δppm: 8.75 (s, 2H, Aromatic ring H), 8.32 (d, 2H, Aromatic ring H), 8.10 (d, 2H, Aromatic ring H).

The reaction was carried out by adding 3,6-dinitro-9-fluorenone (1.35 g) and ethanol in a weight ratio of 1:5 to the reactor, adding iron powder (2 mmol), heating and refluxing, reacting overnight, the base compound fluorene has disappeared. After cooling, remove the solid by filtration and evaporate the solution. Add 100 mL of ethyl acetate dissolved, the organic phase with saturated saline 100 mL wash 3 times, combined organic phase, desiccant drying and then evaporated to dry. Recrystallization from ethyl acetate petroleum ether gave 3,6-diamino 9-fluorenone as a pale yellow solid (0.95 g, 90%) with a purity of greater than 97%. Feature: $^1$H NMR (CHCl$_3$ d$^3$) δppm: 7.59 (d, 2H, Aromatic ring H), 6.99 (d, 2H, Aromatic ring H), 6.42 (d, 2H, Aromatic ring H), 6.27 (m, 4H, NH$_2$).

3,6-diamino 9-fluorenone (950 mg) and 37% concentrated hydrochloric acid were mixed and cooled to 0 to 5° C. 35% aqueous sodium nitrite was added with stirring to keep the temperature from 0 to 5° C. The reaction is 1~1.5 hours.

And then slowly dropping 40% of fluoroboric acid, dropping increased viscosity during the drop, after the addition of 15 minutes after mixing, filtration, drying, and then drying. The diazonium fluoroborate was put into another dry four-necked flask, subjected to a lysis reaction, slowly heated, and after the start of the smoke at 50 V, the electric kettle was removed, and the temperature was again heated at about 130 V The reaction time is the longest and finally heated to 200° C. until no oil is distilled off and then steam distilled. The layers were separated and the aqueous layer was extracted twice with 30 ml of toluene. The organic layers were combined and distilled under reduced pressure until no solvent was distilled off. The mass fraction of 3,6-difluoro-9-fluorenone was measured by gas chromatography area normalization The content was 99.6% and the yield was 80.5%. The product is 3,6-difluoro-9-fluorenone (700 mg, 72%). Feature: $^1$H NMR (CHCl$_3$ d$^3$) δppm: 7.82 (m, 2H, Aromatic ring H), 7.62 (m, 2H, Aromatic ring H), 7.30 (d, 2H, Aromatic ring H).

3.15 g of zinc powder, 1.5 g of mercuric chloride, 10 ml of concentrated hydrochloric acid and 20 ml of water were mixed and stirred for 5 minutes. To the influent water, add 20 ml of 95% ethanol, add 700 mg of 3,6-difluoro-9-fluorenone, reflux reaction 8 h, the reaction process by adding 15 ml of concentrated hydrochloric acid, hard finished, The crude product was recrystallized from ethanol and dried to give a white solid product of 3,6-difluoro-substituted fluorene 523 mg. Feature: $^1$H NMR (CHCl$_3$ d$^3$) δppm: 7.55 (s, 2H, Aromatic ring H), 7.53 (m, 2H, Aromatic ring H), 6.99 (d, 2H, Aromatic ring H), 4.12 (m, 2H, CH$_2$).

(2) 2-fluorocyclopentadienyl, the same procedure as in Example 1 (2).

(3) 10 mmol of 3,6-difluorfluorene was dissolved in 50 ml of diethyl ether and mixed with 10 mmol of n-butyllithium in 1.6 M hexane and stirred for several hours. Add equimolar 2-fluorocyclopentadienyl (supra) and the mixture was stirred overnight. The reaction mixture was then hydrolyzed in 50 ml of water, the organic phase was dried over sodium sulfate and the solvent was evaporated under vacuum.

(4) 20 mmol of 1,3,5-trifluorobenzene was dissolved in 50 mL of ether and cooled to −78° C. 20 mmol of butyllithium was added dropwise. After adding 1 eq of zirconium tetrachloride, the mixture was stirred overnight, A 10 mmol ligand was added dropwise to a mixture of 30 ml of ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 3,6-difluorfluorene-2-fluorocyclopentadiene-di-1,3,5-Trifluorophenyl-zirconium dichloride. Feature: $^1$H NMR (DMSO d$^6$) δppm: 7.55 (m, 4H, Aromatic ring H), 7.28 (m, 1H, Aromatic ring H), 6.99 (m, 2H, Aromatic ring H), 6.40 (m, 4H, Aromatic ring H), 6.21 (m, 1H, Cyclopentadiene H), 6.10 (m, 1H, Cyclopentadiene H), 4.66 (m, 2H, Aromatic ring H), 2.90 (m, 2H, Cyclopentadiene H).

Example 3

3-Ethyl Substituted Fluorene as a Ligand Carbon Bridged Zirconium Metal Catalyst (1) Synthesis of 3-fluoro-fluorene (1.8 g, 10 mmol) 9-fluorenone and water were added to the reactor at a weight ratio of 1:7, stirred and heated. When the temperature rose to 80-90° C., the mixed acid of nitric acid and sulfuric acid And sulfuric acid 8:2), refluxed for 20 hours, quenched with water, filtered, and the resulting solid was recrystallized from methanol and glacial acetic acid and dried to give 3-nitro-9-fluorenone (1.35 g, 50%). Feature: $^1$H NMR (CHCl$_3$ d$^3$) δppm: 8.75 (s, 1H, Aromatic ring H) 8.44 (m, 1H, Aromatic ring H), 8.34 (m, 1H, Aromatic ring H), 8.32 (d, 1H, Aromatic ring H) 8.10 (d, 1H, Aromatic ring H), 7.70 (m, 1H, Aromatic ring H), 7.51 (m, 1H, Aromatic ring H).

A solution of 3-nitro-9-fluorenone (1.35 g) and ethanol in a weight ratio of 1:5 was added to the reactor. Iron powder (2 mmol) was added and stirred under reflux. The reaction was carried out overnight. TLC was used to detect the nitro compound disappeared. After cooling, remove the solid by filtration and evaporate the solution. Add 100 mL of ethyl acetate dissolved, the organic phase with saturated saline 100 mL wash 3 times, combined organic phase, desiccant drying and then evaporated to dry. Recrystallization from ethyl acetate petroleum ether gave 3-amino-9-fluorenone as a pale yellow solid (0.95 g, 90%) with a purity of greater than 97%. Feature: $^1$H NMR (CHCl$_3$ d$^3$) δppm: 8.44 (m, 1H, Aromatic ring H) 8.34 (m, 1H, Aromatic ring H), 7.70 (m, 1H, Aromatic ring H), 7.59 (m, 1H, Aromatic ring H), 7.51 (m, 1H, Aromatic ring H), 6.99 (s, 1H, Aromatic ring H), 6.42 (m, 1H, Aromatic ring H), 6.27 (m, 2H, NH$_2$).

3-amino-9-fluorenone (1.95 g) and 37% concentrated hydrochloric acid were mixed and cooled to 0 to 5° C. 35% aqueous sodium nitrite was added with stirring to keep the temperature between 0 and 5° C.~1.5 hours. And then slowly add the addition of hydrobromic acid, dropwise after adding a catalytic amount of brominated ketones, heated to room temperature and then heated to 50° C. reaction for two hours. TLC shows the reaction is complete. Stop the reaction. The solid was removed by filtration. Ethyl acetate was added to extract 100 mL for 3 times. Combine the organic phase. After drying the desiccant, the desiccant is removed by filtration. Evaporated to dry. The crude product was recrystallized from ethyl acetate and petroleum ether to give a white 3-bromo-9-fluorenone solid (2.33 g, 90%). Feature: $^1$H NMR (CHCl$_3$ d$^3$) δppm: 8.44 (m, 1H, Aromatic ring H) 8.34 (m, 1H, Aromatic ring H), 8.22 (s, 1H, Aromatic ring H), 7.70 (m, 1H, Aromatic ring H), 7.51 (m, 1H, Aromatic ring H), 7.24 (d, 1H, Aromatic ring H), 7.05 (d, 1H, Aromatic ring H).

Mix 877 mg of zinc powder, 405 mg of mercuric chloride, 20 ml of concentrated hydrochloric acid and 40 ml of water for 5 min, add 40 ml of 95% ethanol, add 2.33 g 3-bromo-9-fluorenone, reflux reaction 8 h, the reaction process by adding 30 ml of concentrated hydrochloric acid, hardened, cooled, The product was recrystallized from ethanol and dried to give 1.87 g of 3-bromo-substituted fluorene as a white solid in 85% yield. Feature: $^1$H NMR (CHCl$_3$ d$^3$) δppm: 8.01 (s, 1H, Aromatic ring H) 7.87 (m, 1H, Aromatic ring H), 7.55 (s, 1H, Aromatic ring H), 7.45 (m, 2H, Aromatic ring H), 7.38 (m, 1H, Aromatic ring H), 7.28 (m, 1H, Aromatic ring H), 4.12 (m, 2H, CH$_2$). A 3-bromofluorene solid (1.87 g) was dissolved in 50 ml of anhydrous tetrahydrofuran. 1.1 equivalents of magnesium powder and 200 mg of catalyst were added and the temperature was raised. After the reaction was initiated, the reaction was continued for 2 hours and then cooled to obtain a reagent in tetrahydrofuran solution. Cool to the internal temperature of 0° C.-5° C., and then drop the solution of ethyl bromide. After completion of the dropwise addition, the temperature was raised to room temperature for 4 hours. TLC showed that the reaction was complete. Slowly add an aqueous solution of ammonium chloride to quench the reaction. And extracted three times with 25 ml of ethyl acetate to combine the organic phases. The organic phase was dried with a desiccant and the desiccant was removed by filtration. Evaporated to dryness. The crude product was recrystallized from ethyl acetate and petroleum ether. To give a white 3-ethylfluorene solid (889 mg, 60%).

Feature: $^1$H NMR (CHCl$_3$ d$^3$) δppm: 7.87 (s, 1H, Aromatic ring H) 7.10 (m, 1H, Aromatic ring H), 7.55 (s, 1H, Aromatic ring H), 7.50 (m, 1H, Aromatic ring H), 7.38 (m, 1H, Aromatic ring H), 7.28 (m, 1H, Aromatic ring H), 7.14 (m, 1H, Aromatic ring H), 4.12 (m, 2H, CH$_2$), 2.60 (m, 2H, CH$_2$), 1.25 (t, 3H, CH$_3$).

(2) In the same manner as in Example 1, step (2).

(3) 10 mmol of 3-ethylfluorene was dissolved in 50 ml of diethyl ether and mixed with 10 mmol of n-butyllithium in 1.6 M hexane and stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(4) 20 mmol of 1,3,5-trifluorobenzene was dissolved in 50 mL of ether and cooled to −78° C. 20 mmol of butyllithium was added dropwise. After adding 1 eq of zirconium tetrachloride, the mixture was stirred overnight, A 10 mmol ligand was added dropwise to a mixture of 30 ml of ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 3-ethylfluorene-2-fluorocyclopentadiene-di-1,3,5-tris Fluorophenyl-zirconium dichloride. Feature: $^1$H NMR (DMSO d$^6$) δppm: 7.55 (m, 4H, Aromatic ring H), 7.28 (m, 1H, Aromatic ring H), 6.99 (m, 2H, Aromatic ring H), 6.40 (m, 4H, Aromatic ring H), 6.21 (m, 1H, Cyclopentadiene H), 6.10 (m, 1H, Cyclopentadiene H), 4.66 (m, 2H, Aromatic ring H), 2.90 (m, 2H, Cyclopentadiene H), 2.60 (m, 2H, CH$_2$), 1.25 (m, 3H, CH$_3$).

Example 4

3-Fluoro-Substituted Fluorene as a Ligand-Carbon Bridged Titanium Catalyst (1) 3-Fluoro-substituted fluorene was carried out in the same manner as in Example 1 (1).

(2) Synthesis of 2-fluorocyclopentadienyl: 10 mmol of sodium was added to 10 ml of ethanol. Then add 10 mmol of toluene ketone. Then 20 mmol of 2-fluorocyclopentadiene was added dropwise and the mixture was stirred under reflux for 15 hours. The resulting product was then diluted with water and extracted with pentane. The organic phase was distilled off, the excess 2-fluorocyclopentadienyl group was distilled off, extracted with ethyl acetate, dried, and evaporated to dryness.

(3) 10 mmol of 3-fluorofluorene was dissolved in 50 ml of diethyl ether and mixed with 10 mmol of n-butyllithium in 1.6 M hexane and stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(4) 20 mmol of 1,3,5-trifluorobenzene was dissolved in 50 mL of ether and cooled to −78° C. 20 mmol of butyllithium was added dropwise. After addition, 1 eq of titanium tetrachloride was added and the mixture was stirred overnight. A 10 mmol ligand was added dropwise to a mixture of 30 ml of ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 3-fluorofluorene-2-fluorocyclopentadiene-di-1,3,5-trifluoride Phenyl-titanium dichloride. Feature: $^1$H NMR (DMSO d$^6$) δppm: 7.87 (m, 1H, Aromatic ring H) 7.55 (m, 3H, Aromatic ring H), 7.38 (m, 1H, Aromatic ring H), 7.28 (m, 1H, Aromatic ring H), 6.99 (m, 1H, Aromatic ring H), 6.40 (m, 4H, Aromatic ring H), 6.21 (m, 1H, Cyclopentadiene H), 6.10 (m, 1H, Cyclopentadiene H), 4.66 (m, 2H, Aromatic ring H), 2.90 (m, 2H, Cyclopentadiene H).

Example 5

3,6-Difluoro-Substituted Fluorene as a Ligand Carbon-Bridged Titanium Metal Catalyst (1) 3,6-difluoro-substituted fluorene was carried out in the same manner as in Example 2, step (1).

(2) 2-fluorocyclopentadienyl, followed by step (2) of Example 4.

(3) 10 mmol of 3,6-difluorfluorene was dissolved in 50 ml of diethyl ether and mixed with 10 mmol of n-butyllithium in 1.6 M hexane and stirred for several hours. Add equimolar 2-fluorocyclopentadienyl (supra) and the mixture was stirred overnight. The reaction mixture was then hydrolyzed in 50 ml of water, the organic phase was dried over sodium sulfate and the solvent was evaporated under vacuum.

(4) 20 mmol of 1,3,5-trifluorobenzene was dissolved in 50 mL of ether and cooled to −78° C. 20 mmol of butyllithium was added dropwise. After addition, 1 eq of titanium tetrachloride was added and the mixture was stirred overnight. A 10 mmol ligand was added dropwise to a mixture of 30 ml of ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum.

For purification, the residue was dissolved in pentane and the solution was filtered through silica gel and crystallized at −30° C. to give the corresponding 3,6-difluorofluorene-2-fluorocyclopentadiene-di-1,3,5-Trifluorophenyl-Titanium Dioxide. Feature: $^1$H NMR (DMSO d$^6$) δppm: 7.55 (m, 4H, Aromatic ring H), 7.28 (m, 1H, Aromatic ring H), 6.99 (m, 2H, Aromatic ring H), 6.40 (m, 4H, Aromatic ring H), 6.21 (m, 1H, Cyclopentadiene H), 6.10 (m, 1H, Cyclopentadiene H), 4.66 (m, 2H, Aromatic ring H), 2.90 (m, 2H, Cyclopentadiene H).

Example 6

3-Ethyl Substituted Fluorene as a Ligand Carbon Bridged Titanium Catalyst (1) 3-Ethyl-substituted fluorene, in the same manner as in Example 3, step (1).

(2) 2-fluorocyclopentadienyl, followed by step (2) of Example 4.

(3) 10 mmol of 3-ethylfluorene was dissolved in 50 ml of diethyl ether and mixed with 10 mmol of n-butyllithium in 1.6 M hexane and stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(4) 20 mmol of 1,3,5-trifluorobenzene was dissolved in 50 mL of ether and cooled to −78° C. 20 mmol of butyllithium was added dropwise. After addition, 1 eq of titanium tetrachloride was added and the mixture was stirred overnight. A 10 mmol ligand was added dropwise to a mixture of 30 ml of ether.

After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 3-ethylfluorene-2-fluorocyclopentadiene-di-1,3,5-tris Fluorophenyl-titanium dichloride. Feature: $^1$H NMR (DMSO d$^6$) δppm: 7.55 (m, 4H, Aromatic ring H), 7.28 (m, 1H, Aromatic ring H), 6.99 (m, 2H, Aromatic ring H), 6.40 (m, 4H, Aromatic ring H), 6.21 (m, 1H, Cyclopentadiene H), 6.10 (m, 1H, Cyclopentadiene H), 4.66 (m, 2H, Aromatic ring H), 2.90 (m, 2H, Cyclopentadiene H), 2.60 (m, 2H, CH$_2$), 1.25 (m, 3H, CH$_3$).

Example 7

3-Fluoro-Substituted Fluorene as a Ligand-Carbon Bridged Hafnium Metal Catalyst (1) 3-Fluoro-substituted fluorene was carried out in the same manner as in Example 1 (1).

(2) Synthesis of 2-fluorocyclopentadienyl: 10 mmol of sodium was added to 10 ml of ethanol. Then add 10 mmol of toluene ketone. Then 20 mmol of 2-fluorocyclopentadiene was added dropwise and the mixture was stirred under reflux for 15 hours. The resulting product was then diluted with water and extracted with pentane. The organic phase was distilled off, the excess 2-fluorocyclopentadienyl group was distilled off, extracted with ethyl acetate, dried, and evaporated to dryness.

(3) 10 mmol of 3-fluorofluorene was dissolved in 50 ml of diethyl ether and mixed with 10 mmol of n-butyllithium in 1.6 M hexane and stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(4) 20 mmol of 1,3,5-trifluorobenzene was dissolved in 50 mL of diethyl ether and cooled to −78° C. 20 mmol of butyllithium was added dropwise. After adding 1 eq of hafnium tetrachloride, the mixture was stirred overnight, A 10 mmol ligand was added dropwise to a mixture of 30 ml of ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 3-fluorofluorene-2-fluorocyclopentadiene-di-1,3,5-trifluoride Phenyl-hafnium dichloride. Feature: $^1$H NMR (DMSO d$^6$) δppm: 7.87 (m, 1H, Aromatic ring H) 7.55 (m, 3H, Aromatic ring H), 7.38 (m, 1H, Aromatic ring H), 7.28 (m, 1H, Aromatic ring H), 6.99 (m, 1H, Aromatic ring H), 6.40 (m, 4H, Aromatic ring H), 6.21 (m, 1H, Cyclopentadiene H), 6.10 (m, 1H, Cyclopentadiene H), 4.66 (m, 2H, Aromatic ring H), 2.90 (m, 2H, Cyclopentadiene H).

Example 8

3,6-Difluoro-Substituted Fluorene as a Ligand-Carbon Bridged Hafnium Metal Catalyst (1) 3,6-Difluoro-substituted fluorene was carried out in the same manner as in Example 2, step (1).

(2) Synthesis of 2-fluorocyclopentadienyl: 10 mmol of sodium dross was added to 10 ml of ethanol. Then add 10 mmol of toluene ketone. Then 20 mmol of 2-fluorocyclopentadiene was added dropwise and the mixture was stirred under reflux for 15 hours. The resulting product was then diluted with water and extracted with pentane. The organic phase was distilled off, the excess 2-fluorocyclopentadienyl group was distilled off, extracted with ethyl acetate, dried, and evaporated to dryness.

(3) 10 mmol of 3,6-difluorfluorene was dissolved in 50 ml of diethyl ether and mixed with 10 mmol of n-butyllithium in 1.6 M hexane and stirred for several hours. Add equimolar 2-fluorocyclopentadienyl (supra) and the mixture was stirred overnight. The reaction mixture was then hydrolyzed in 50 ml of water, the organic phase was dried over sodium sulfate and the solvent was evaporated under vacuum.

(4) 20 mmol of 1,3,5-trifluorobenzene was dissolved in 50 mL of diethyl ether and cooled to −78° C. 20 mmol of butyllithium was added dropwise. After adding 1 eq of hafnium tetrachloride, the mixture was stirred overnight, A 10 mmol ligand was added dropwise to a mixture of 30 ml of ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum.

For purification, the residue was dissolved in pentane and the solution was filtered through silica gel and crystallized at −30° C. to give the corresponding 3,6-difluorfluorene-2-fluorocyclopentadiene-di-1,3,5-Trifluorophenyl-hafnium dichloride. Feature: $^1$H NMR (DMSO d$^6$) δppm: 7.55 (m, 4H, Aromatic ring H), 7.28 (m, 1H, Aromatic ring H), 6.99 (m, 2H, Aromatic ring H), 6.40 (m, 4H, Aromatic ring H), 6.21 (m, 1H, Cyclopentadiene H), 6.10 (m, 1H, Cyclopentadiene H), 4.66 (m, 2H, Aromatic ring H), 2.90 (m, 2H, Cyclopentadiene H).

Example 9

3-Ethyl-Substituted Fluorene as Ligand-Carbon Bridged Hafnium Metal Catalyst (1) 3-ethyl-substituted fluorene, in the same manner as in Example 3, step (1).

(2) Synthesis of 2-fluorocyclopentadienyl: 10 mmol of sodium dross was added to 10 ml of ethanol. Then add 10 mmol of toluene ketone. Then 20 mmol of 2-fluorocyclopentadiene was added dropwise and the mixture was stirred under reflux for 15 hours. The resulting product was then diluted with water and extracted with pentane. The organic phase was distilled off, the excess 2-fluorocyclopentadienyl group was distilled off, extracted with ethyl acetate, dried, and evaporated to dryness.

(3) 10 mmol of 3-ethylfluorene was dissolved in 50 ml of diethyl ether and mixed with 10 mmol of n-butyllithium in 1.6 M hexane and stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(4) 20 mmol of 1,3,5-trifluorobenzene was dissolved in 50 mL of diethyl ether and cooled to −78° C. 20 mmol of butyllithium was added dropwise. After adding 1 eq of hafnium tetrachloride, the mixture was stirred overnight, A 10 mmol ligand was added dropwise to a mixture of 30 ml of ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 3-ethylfluorene-2-fluorocyclopentadiene-di-1,3,5-tris Fluorophenyl-hafnium dichloride. Feature: $^1$H NMR (DMSO d$^6$) δppm: 7.55 (m, 4H, Aromatic ring H), 7.28 (m, 1H, Aromatic ring H), 6.99 (m, 2H, Aromatic ring H), 6.40 (m, 4H, Aromatic ring H), 6.21 (m, 1H, Cyclopentadiene H), 6.10 (m, 1H, Cyclopentadiene H), 4.66 (m, 2H, Aromatic ring H), 2.90 (m, 2H, Cyclopentadiene H), 2.60 (m, 2H, CH$_2$), 1.25 (m, 3H, CH$_3$).

Example 10

3-fluoro Substituted Fluorene is a Zirconium-Supported Zirconium Metal Catalyst (1) Synthesis of 3-Fluoro-substituted fluorene. In the same way as in Example 1 (1)

(2) Synthesis of 2-fluorocyclopentadienyl groups: The same procedure as in Example 1 (2)

(3) 10 mmol of 3-fluorofluorene was dissolved in 50 ml of diethyl ether and mixed with 10 mmol of n-butyllithium in 1.6 M hexane and stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(4) 20 mmol of cyclohexylmethylchlorosilane was dissolved in 50 mL of ether and cooled to −78° C. 20 mmol of butyllithium was added dropwise. After addition, 1 eq of zirconium tetrachloride was added and the mixture was stirred overnight. Mmol ligands were dissolved in 30 ml of diethyl ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum.

For purification, the residue was dissolved in pentane and the solution was filtered through silica gel and crystallized at −30° C. to give the corresponding 3-fluoro-fluorene-2-fluorocyclopentadiene-cyclohexylmethylsilyl-zirconium dichloride. Feature: $^1$H NMR (DMSO d$^6$) δppm: 7.87 (m, 1H, Aromatic ring H) 7.55 (m, 3H, Aromatic ring H), 7.38 (m, 1H, Aromatic ring H), 7.28 (m, 1H, Aromatic ring H), 6.99 (m, 1H, Aromatic ring H), 6.21 (m, 1H, Cyclopentadiene H), 6.10 (m, 1H, Cyclopentadiene H), 4.66 (m, 2H, Aromatic ring H), 2.90 (m, 2H, Cyclopentadiene H), 0.85 (m, 10H, Cyclohexyl H).

Example 11

3,6-difluoro-Substituted Fluorene is a Zirconium-Supported Zirconium Metal Catalyst (1) Synthesis of 3,6-difluoro-substituted. With the same procedure as in Example 1 (1)

(2) 2-Fluorocyclopentadienyl, followed by step (2) of Example 1.

(3) 10 mmol of 3,6-difluorfluorene was dissolved in 50 ml of diethyl ether and mixed with 10 mmol of n-butyllithium in 1.6 M hexane and stirred for several hours. Add equimolar 2-fluorocyclopentadienyl (supra) and the mixture was stirred overnight. The reaction mixture was then hydrolyzed in 50 ml of water, the organic phase was dried over sodium sulfate and the solvent was evaporated under vacuum.

(4) 20 mmol of cyclohexylchlorosilane was dissolved in 50 mL of diethyl ether and cooled to −78° C. 20 mmol of butyllithium was added dropwise. After adding 1 eq of zirconium tetrachloride, the mixture was stirred overnight and then 10 mmol the mixture was dissolved in 30 ml of diethyl ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 3,6-difluorfluorene-2-fluorocyclopentadiene-cyclohexylsilyl-dichloro Zirconium. Feature: $^1$H NMR (DMSO d$^6$) δppm: 7.55 (m, 4H, Aromatic ring H), 7.28 (m, 1H, Aromatic ring H), 6.99 (m, 2H, Aromatic ring H), 6.21 (m, 1H, Cyclopentadiene H), 6.10 (m, 1H, Cyclopentadiene H), 4.66 (m, 2H, Aromatic ring H), 2.90 (m, 2H, Cyclopentadiene H), 0.85 (m, 10H, Cyclohexyl H).

Example 12

3-Ethyl-Substituted Fluorene as a Ligand for Silicon Bridged Zirconium Metal Catalyst (1) Synthesis of 3-ethyl-substituted. See Example 1

(2) In the same manner as in Example 1, step (2)

(3) 10 mmol of 3-ethylfluorene was dissolved in 50 ml of diethyl ether and mixed with 10 mmol of n-butyllithium in 1.6 M hexane and stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(4) 20 mmol of cyclohexylchlorosilane was dissolved in 50 mL of diethyl ether and cooled to −78° C. 20 mmol of butyllithium was added dropwise. After adding 1 eq of zirconium tetrachloride, the mixture was stirred overnight and then 10 mmol the mixture was dissolved in 30 ml of diethyl ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 3-ethylfluorene-2-fluorocyclopentadiene-cyclohexylsilyl-zirconium dichloride.

Feature: $^1$H NMR (DMSO d$^6$) δppm: 7.55 (m, 4H, Aromatic ring H), 7.28 (m, 1H, Aromatic ring H), 6.99 (m, 2H, Aromatic ring H), 6.21 (m, 1H, Cyclopentadiene H), 6.10 (m, 1H, Cyclopentadiene H), 4.66 (m, 2H, Aromatic ring H), 2.90 (m, 2H, Cyclopentadiene H), 2.60 (m, 2H, CH$_2$), 1.25 (m, 3H, CH$_3$), 0.85 (m, 10H, Cyclohexyl H).

Example 13

3-Fluoro-Substituted Fluorene is a Titanium-Bridged Titanium Metal Catalyst (1) 3-Fluoro-substituted fluorene was carried out in the same manner as in Example 1 (1).

(2) Synthesis of 2-fluorocyclopentadienyl group: The same procedure as in Example 1 (2).

(3) 10 mmol of 3-fluorofluorene was dissolved in 50 ml of diethyl ether and mixed with 10 mmol of n-butyllithium in 1.6 M hexane and stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(4) 20 mmol of cyclohexylchlorosilane was dissolved in 50 mL of diethyl ether and cooled to −78° C. 20 mmol of butyllithium was added dropwise. After addition, 1 eq of titanium tetrachloride was added and the mixture was stirred overnight. The mixture was dissolved in 30 ml of diethyl ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 3-fluoro-fluorene-2-fluorocyclopentadiene-cyclohexylchlorosilyl-titanium dichloride.

Feature: $^1$H NMR (DMSO d$^6$) δppm: 7.87 (m, 1H, Aromatic ring H) 7.55 (m, 3H, Aromatic ring H), 7.38 (m, 1H, Aromatic ring H), 7.28 (m, 1H, Aromatic ring H), 6.99 (m, 1H, Aromatic ring H), 6.21 (m, 1H, Cyclopentadiene H), 6.10 (m, 1H, Cyclopentadiene H), 4.66 (m, 2H, Aromatic ring H), 2.90 (m, 2H, Cyclopentadiene H), 0.85 (m, 10H, Cyclohexyl H).

Example 14

3,6-Difluoro-Substituted Fluorene is a Titanium Bridged Titanium Metal Catalyst (1) 3,6-difluoro-substituted fluorene was carried out in the same manner as in Example 2, step (1).

(2) 2-fluorocyclopentadienyl, followed by step (2) of Example 4.

(3) 10 mmol of 3,6-difluorfluorene was dissolved in 50 ml of diethyl ether and mixed with 10 mmol of n-butyllithium in 1.6 M hexane and stirred for several hours. Add equimolar 2-fluorocyclopentadienyl (supra) and the mixture was stirred overnight. The reaction mixture was then hydrolyzed in 50 ml of water, the organic phase was dried over sodium sulfate and the solvent was evaporated under vacuum.

(4) 20 mmol of 1-cyclohexylchlorosilane was dissolved in 50 mL of ether and cooled to −78° C. 20 mmol of butyllithium was added dropwise. After addition, 1 eq of titanium tetrachloride was added and the mixture was stirred overnight. The ligand was dissolved in 30 ml of diethyl ether.

After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 3,6-difluorfluorene-2-fluorocyclo-pentadiene-cyclohexylchlorosilane-dichloro Titanium.

Feature: $^1$H NMR (DMSO d$^6$) δppm: 7.55 (m, 4H, Aromatic ring H), 7.28 (m, 1H, Aromatic ring H), 6.99 (m, 2H, Aromatic ring H), 6.21 (m, 1H, Cyclopentadiene H), 6.10 (m, 1H, Cyclopentadiene H), 4.66 (m, 2H, Aromatic ring H), 2.90 (m, 2H, Cyclopentadiene H), 0.85 (m, 10H, Cyclohexyl H).

Example 15

3-Ethyl-Substituted Fluorene is a Titanium-Bridged Titanium Metal Catalyst (1) 3-ethyl-substituted fluorene, in the same manner as in Example 3, step (1).

(2) 2-fluorocyclopentadienyl, followed by step (2) of Example 4.

(3) 10 mmol of 3-ethylfluorene was dissolved in 50 ml of diethyl ether and mixed with 10 mmol of n-butyllithium in 1.6 M hexane and stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(4) 20 mmol of cyclohexylchlorosilane was dissolved in 50 mL of diethyl ether and cooled to −78° C. 20 mmol of butyllithium was added dropwise. After addition, 1 eq of titanium tetrachloride was added and the mixture was stirred overnight. The mixture was dissolved in 30 ml of diethyl ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 3-ethylfluorene-2-fluorocyclopenta-diene-cyclohexylsilyl-titanium dichloride. Feature: $^1$H NMR (DMSO d$^6$) δppm: 7.55 (m, 4H, Aromatic ring H), 7.28 (m, 1H, Aromatic ring H), 6.99 (m, 2H, Aromatic ring H), 6.21 (m, 1H, Cyclopentadiene H), 6.10 (m, 1H, Cyclopentadiene H), 4.66 (m, 2H, Aromatic ring H), 2.90 (m, 2H, Cyclopentadiene H), 2.60 (m, 2H, CH$_2$), 1.25 (m, 3H, CH$_3$), 0.85 (m, 10H, Cyclohexyl H).

Example 16

3-Fluoro-Substituted Fluorene as the Ligand Silicon Bridged Hafnium Metal Catalyst (1) 3-fluoro-substituted fluorene was carried out in the same manner as in Example 1 (1).

(2) Synthesis of 2-fluorocyclopentadienyl: 10 mmol of sodium dross was added to 10 ml of ethanol. Then add 10 mmol of toluene ketone. Then 20 mmol of 2-fluorocyclo-pentadiene was added dropwise and the mixture was stirred under reflux for 15 hours. The resulting product was then diluted with water and extracted with pentane. The organic phase was distilled off, the excess 2-fluorocyclopentadienyl group was distilled off, extracted with ethyl acetate, dried, and evaporated to dryness.

(3) 10 mmol of 3-fluorofluorene was dissolved in 50 ml of diethyl ether and mixed with 10 mmol of n-butyllithium in 1.6 M hexane and stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(4) 20 mmol of cyclohexylchlorosilane was dissolved in 50 mL of ether and cooled to −78° C. 20 mmol of butyl-lithium was added dropwise. After adding 1 eq of hafnium tetrachloride, the mixture was stirred overnight and then 10 mmol the mixture was dissolved in 30 ml of diethyl ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 3-fluoro-fluorene-2-fluorocyclopen-tadiene-cyclohexylsilyl-hafnium dichloride.

Feature: $^1$H NMR (DMSO d$^6$) δppm: 7.87 (m, 1H, Aromatic ring H) 7.55 (m, 3H, Aromatic ring H), 7.38 (m, 1H, Aromatic ring H), 7.28 (m, 1H, Aromatic ring H), 6.99 (m, 1H, Aromatic ring H), 6.21 (m, 1H, Cyclopentadiene H), 6.10 (m, 1H, Cyclopentadiene H), 4.66 (m, 2H, Aromatic ring H), 2.90 (m, 2H, Cyclopentadiene H), 0.85 (m, 10H, Cyclohexyl H).

Example 17

3,6-Difluoro-Substituted Fluorene is a Bridged Hafnium Metal Catalyst (1) 3,6-difluoro-substituted fluorene was carried out in the same manner as in Example 2, step (1).

(2) Synthesis of 2-fluorocyclopentadienyl: 10 mmol of sodium dross was added to 10 ml of ethanol. Then add 10 mmol of toluene ketone. Then 20 mmol of 2-fluorocyclo-pentadiene was added dropwise and the mixture was stirred under reflux for 15 hours. The resulting product was then diluted with water and extracted with pentane. The organic phase was distilled off, the excess 2-fluorocyclopentadienyl group was distilled off, extracted with ethyl acetate, dried, and evaporated to dryness.

(3) 10 mmol of 3,6-difluorfluorene was dissolved in 50 ml of diethyl ether and mixed with 10 mmol of n-butyllithium in 1.6 M hexane and stirred for several hours. Add equimolar 2-fluorocyclopentadienyl (supra) and the mixture was stirred overnight. The reaction mixture was then hydrolyzed in 50 ml of water, the organic phase was dried over sodium sulfate and the solvent was evaporated under vacuum.

(4) 20 mmol of cyclohexylchlorosilane was dissolved in 50 mL of ether and cooled to −78° C. 20 mmol of butyl-lithium was added dropwise. After adding 1 eq of hafnium tetrachloride, the mixture was stirred overnight and then 10 mmol the mixture was dissolved in 30 ml of diethyl ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum.

For purification, the residue was dissolved in pentane and the solution was filtered through silica gel and crystallized at −30° C. to give the corresponding 3,6-difluorfluorene-2-fluorocyclopentadiene-cyclohexylsilyl-dichloro Hafnium.

Feature: $^1$H NMR (DMSO d$^6$) δppm: 7.55 (m, 4H, Aromatic ring H), 7.28 (m, 1H, Aromatic ring H), 6.99 (m, 2H, Aromatic ring H), 6.21 (m, 1H, Cyclopentadiene H), 6.10 (m, 1H, Cyclopentadiene H), 4.66 (m, 2H, Aromatic ring H), 2.90 (m, 2H, Cyclopentadiene H), 0.85 (m, 10H, Cyclohexyl H).

Example 18

3-Ethyl Substituted Fluorene as a Ligand Silicon Bridged Hafnium Metal Catalyst (1) 3-Ethyl-substituted fluorene, prepared in the same manner as in Example 3, step (1).

(2) Synthesis of 2-fluorocyclopentadienyl: 10 mmol of sodium dross was added to 10 ml of ethanol. Then add 10 mmol of toluene ketone. Then 20 mmol of 2-fluorocyclopentadiene was added dropwise and the mixture was stirred under reflux for 15 hours. The resulting product was then diluted with water and extracted with pentane. The organic phase was distilled off, the excess 2-fluorocyclopentadienyl group was distilled off, extracted with ethyl acetate, dried, and evaporated to dryness.

(3) 10 mmol of 3-ethylfluorene was dissolved in 50 ml of diethyl ether and mixed with 10 mmol of n-butyllithium in 1.6 M hexane and stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(4) 20 mmol of cyclohexylchlorosilane was dissolved in 50 mL of ether and cooled to −78° C. 20 mmol of butyllithium was added dropwise. After adding 1 eq of hafnium tetrachloride, the mixture was stirred overnight and then 10 mmol the mixture was dissolved in 30 ml of diethyl ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 3-ethylfluorene-2-fluorocyclopentadiene-cyclohexylsilyl-hafnium dichloride.

Feature: $^1$H NMR (DMSO d$^6$) δppm: 7.55 (m, 4H, Aromatic ring H), 7.28 (m, 1H, Aromatic ring H), 6.99 (m, 2H, Aromatic ring H), 6.40 (m, 4H, Aromatic ring H), 6.21 (m, 1H, Cyclopentadiene H), 6.10 (m, 1H, Cyclopentadiene H), 4.66 (m, 2H, Aromatic ring H), 2.90 (m, 2H, Cyclopentadiene H), 2.60 (m, 2H, CH$_2$), 1.25 (m, 3H, CH$_3$), 0.85 (m, 10H, Cyclohexyl H).

Example 19

5H-indeno [1,2-b] pyridyl as a Ligand Carbon Bridged Zirconium Metal Catalyst (1) Synthesis of 2-fluorocyclopentadienyl: to 10 ml of ethanol was added 10 mmol of sodium, and then was added 10 mmol of toluenone, and 20 mmol 2-fluoropentadiene. The mixture was stirred for 15 hours. The resulting material was then diluted with water and extracted with pentane, evaporated to remove organic phase, and distilled to remove excess 2-fluorocyclopentadienyl, and then extracted with ethyl acetate, dried, filtered and evaporated to dryness.

(2) 10 mmol of 5H-indeno [1,2-b] pyridine was dissolved in 50 ml of diethyl ether and mixed with 10 mmol of n-butyllithium in 1.6 M hexane and stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(3) 20 mmol of 1,3,5-trifluorobenzene was dissolved in 50 mL of ether and cooled to −78° C. 20 mmol of butyllithium was added dropwise. After adding 1 eq of zirconium tetrachloride, the mixture was stirred overnight, A 10 mmol ligand was added dropwise to a mixture of 30 ml of ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum.

For purification, the residue was dissolved in pentane and the solution was filtered through silica gel and crystallized at −30° C. to give the corresponding 5H-indeno [1,2-b] pyridine-2-fluorocyclopentadiene-1,3,5-trifluorophenyl-zirconium dichloride.

Feature: $^1$H NMR (DMSO d$^6$) δppm: 8.50 (m, 1H, Aromatic ring H), 7.95 (m, 1H, Aromatic ring H), 7.85 (m, 1H, Aromatic ring H), 7.60 (m, 1H, Aromatic ring H), 7.40 (m, 1H, Aromatic ring H), 7.15 (m, 1H, Aromatic ring H), 6.40 (m, 4H, Aromatic ring H), 6.21 (m, 1H, Cyclopentadiene H), 6.10 (m, 1H, Cyclopentadiene H), 2.90 (m, 2H, Cyclopentadiene H), 2.65 (m, 2H, Aromatic ring H).

Example 20

5H-indeno [1,2-b] pyridyl as a Ligand Carbon Bridged Titanium Catalyst (1) 2-Fluorocyclopentadienyl, prepared in the same manner as in step (1) of Example 19.

(2) 10 mmol of 5H-indeno [1,2-b] pyridine was dissolved in 50 ml of diethyl ether and mixed with 10 mmol of n-butyllithium in 1.6 M hexane and stirred for several hours. Add equimolar 2-fluorocyclopentadienyl (supra) and the mixture was stirred overnight. The reaction mixture was then hydrolyzed in 50 ml of water, the organic phase was dried over sodium sulfate and the solvent was evaporated under vacuum.

(3) 20 mmol of 1,3,5-trifluorobenzene was dissolved in 50 mL of ether and cooled to −78° C. 20 mmol of butyllithium was added dropwise. After addition, 1 eq of titanium tetrachloride was added and the mixture was stirred overnight. A 10 mmol ligand was added dropwise to a mixture of 30 ml of ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 5H-indeno [1,2-b] pyridine-2-fluorocyclopentadiene-1,3,5-trifluorophenyl-titanium dichloride. Feature: $^1$H NMR (DMSO d$^6$) δppm: 8.50 (m, 1H, Aromatic ring H), 7.95 (m, 1H, Aromatic ring H), 7.85 (m, 1H, Aromatic ring H), 7.60 (m, 1H, Aromatic ring H), 7.40 (m, 1H, Aromatic ring H), 7.15 (m, 1H, Aromatic ring H), 6.40 (m, 4H, Aromatic ring H), 6.21 (m, 1H, Cyclopentadiene H), 6.10 (m, 1H, Cyclopentadiene H), 2.90 (m, 2H, Cyclopentadiene H), 2.65 (m, 2H, Aromatic ring H).

Example 21

5H-indeno [1,2-b] pyridyl as a Ligand Carbon Bridged Hafnium Metal Catalyst

(1) 2-Fluorocyclopentadienyl, prepared in the same manner as in step (1) of Example 19.

(2) 10 mmol of 5H-indeno [1,2-b] pyridine was dissolved in 50 ml of diethyl ether and mixed with 10 mmol of n-butyllithium in 1.6 M hexane and stirred for several hours. Add equimolar 2-fluorocyclopentadienyl (supra) and the mixture was stirred overnight. The reaction mixture was then hydrolyzed in 50 ml of water, the organic phase was dried over sodium sulfate and the solvent was evaporated under vacuum.

(3) 20 mmol of 1,3,5-trifluorobenzene was dissolved in 50 mL of diethyl ether and cooled to −78° C. 20 mmol of butyllithium was added dropwise. After adding 1 eq of hafnium tetrachloride, the mixture was stirred overnight, A 10 mmol ligand was added dropwise to a mixture of 30 ml of ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 5H-indeno [1,2-b] pyridine-2-fluorocyclopentadiene-1,3,5-trifluoro phenyl-hafnium dichloride. Feature: $^1$H NMR (DMSO d$^6$) 8.50 (m, 1H, Aromatic ring H), 7.95 (m, 1H, Aromatic ring H), 7.85 (m, 1H, Aromatic ring H), 7.60 (m, 1H, Aromatic ring H), 7.40 (m, 1H, Aromatic ring H), 7.15 (m, 1H, Aromatic ring H), 6.40 (m, 4H, Aromatic ring H), 6.21 (m, 1H, Cyclopentadiene H), 6.10 (m, 1H, Cyclopentadiene H), 2.90 (m, 2H, Cyclopentadiene H), 2.65 (m, 2H, Aromatic ring H).

Example 22

5H-indeno [1,2-b] pyridyl as a Ligand Silicon Bridged Zirconium Metal Catalyst

(1) Synthesis of 2-fluorocyclopentadienyl group: prepared in the same manner as the step (1) in Example 19.

(2) 5H-indeno [1,2-b] pyridine was dissolved in 50 ml of diethyl ether and mixed with 10 mmol of n-butyllithium in 1.6 M hexane and then stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(3) 20 mmol of cyclohexylchlorosilane was dissolved in 50 mL of diethyl ether and cooled to −78° C. 20 mmol of butyllithium was added dropwise. After adding 1 eq of zirconium tetrachloride, the mixture was stirred overnight and then 10 mmol The mixture was dissolved in 30 ml of diethyl ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 5H-indeno [1,2-b] pyridine-2-fluorocyclopentadiene-Silicon-zirconium dichloride. Feature: $^1$H NMR (DMSO d$^6$) δppm: 8.50 (m, 1H, Aromatic ring H), 7.95 (m, 1H, Aromatic ring H), 7.85 (m, 1H, Aromatic ring H), 7.60 (m, 1H, Aromatic ring H), 7.40 (m, 1H, Aromatic ring H), 7.15 (m, 1H, Aromatic ring H), 6.21 (m, 1H, Cyclopentadiene H), 6.10 (m, 1H, Cyclopentadiene H), 2.90 (m, 2H, Cyclopentadiene H), 2.65 (m, 2H, Aromatic ring H), 2.60 (m, 2H, CH$_2$), 1.25 (m, 3H, CH$_3$), 0.85 (m, 10H, Cyclopentadiene H).

Example 23

5H-indeno [1,2-b] pyridyl as a Ligand Silicon Bridged Titanium Catalyst

(1) Synthesis of 2-fluorocyclopentadienyl group: prepared in the same manner as the step (1) in Example 19.

(2) 5H-indeno [1,2-b] pyridine was dissolved in 50 ml of diethyl ether and mixed with 10 mmol of n-butyllithium in 1.6 M hexane and then stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(3) 20 mmol of cyclohexylchlorosilane was dissolved in 50 mL of diethyl ether and cooled to −78° C. 20 mmol of butyllithium was added dropwise. After addition, 1 eq of titanium tetrachloride was added and the mixture was stirred overnight. The mixture was dissolved in 30 ml of diethyl ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 5H-indeno [1,2-b] pyridine-2-fluorocyclopentadiene-Silicon-titanium dichloride. Feature: $^1$H NMR (DMSO d$^6$) δppm: 8.50 (m, 1H, Aromatic ring H), 7.95 (m, 1H, Aromatic ring H), 7.85 (m, 1H, Aromatic ring H), 7.60 (m, 1H, Aromatic ring H), 7.40 (m, 1H, Aromatic ring H), 7.15 (m, 1H, Aromatic ring H), 6.21 (m, 1H, Cyclopentadiene H), 6.10 (m, 1H, Cyclopentadiene H), 2.90 (m, 2H, Cyclopentadiene H), 2.65 (m, 2H, Aromatic ring H), 2.60 (m, 2H, CH$_2$), 1.25 (m, 3H, CH$_3$), 0.85 (m, 10H, Cyclohexyl H).

Example 24

5H-indeno [1,2-b] pyridyl as a Ligand Silicon Bridged Hafnium Metal Catalyst

(1) Synthesis of 2-fluorocyclopentadienyl group: prepared in the same manner as the step (1) in Example 19.

(2) 5H-indeno [1,2-b] pyridine was dissolved in 50 ml of diethyl ether and mixed with 10 mmol of n-butyllithium in 1.6 M hexane and then stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(3) 20 mmol of cyclohexylchlorosilane was dissolved in 50 mL of ether and cooled to −78° C. 20 mmol of butyllithium was added dropwise. After adding 1 eq of hafnium tetrachloride, the mixture was stirred overnight and then 10 mmol the mixture was dissolved in 30 ml of diethyl ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 5H-indeno [1,2-b] pyridine-2-fluorocyclopentadiene-Silicon-hafnium dichloride. Feature: $^1$H NMR (DMSO d$^6$) δppm: 8.50 (m, 1H, Aromatic ring H), 7.95 (m, 1H, Aromatic ring H), 7.85 (m, 1H, Aromatic ring H), 7.60 (m, 1H, Aromatic ring H), 7.40 (m, 1H, Aromatic ring H), 7.15 (m, 1H, Aromatic ring H), 6.21 (m, 1H, Cyclopentadiene H), 6.10 (m, 1H, Cyclopentadiene H), 2.90 (m, 2H, Cyclopentadiene H), 2.65 (m, 2H, Aromatic ring H), 2.60 (m, 2H, CH$_2$), 1.25 (m, 3H, CH$_3$), 0.85 (m, 10H, Cyclohexyl H).

Example 25

5H-indeno [1,2-b] thiopyranyl as a Ligand Carbon Bridged Zirconium Metal Catalyst (1) Synthesis of 2-fluorocyclopentadienyl: prepared in the same manner as the step (1) in Example 19

(2) 10 mmol of 5H-indeno [1,2-b] thiopyran was dissolved in 50 ml of diethyl ether and mixed with 10 mmol of n-butyllithium in 1.6 M hexane and stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(3) 20 mmol of 1,3,5-trifluorobenzene was dissolved in 50 mL of ether and cooled to −78° C. 20 mmol of butyllithium was added dropwise. After adding 1 eq of zirconium tetrachloride, the mixture was stirred overnight, A 10 mmol ligand was added dropwise to a mixture of 30 ml of ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum.

For purification, the residue was dissolved in pentane and the solution was filtered through silica gel and crystallized at −30° C. to give the corresponding 5H-indeno [1,2-b] thiopyran-2-fluorocyclopentadiene-di-1,3,5-trifluorophenyl-zirconium dichloride. Feature: $^1$H NMR (DMSO d$^6$) δppm: 8.90 (m, 1H, Aromatic ring H), 8.35 (m, 1H, Aromatic ring H), 8.25 (m, 1H, Aromatic ring H), 8.00 (m, 1H, Aromatic ring H), 7.80 (m, 1H, Aromatic ring H), 7.55 (m, 1H, Aromatic ring H), 6.40 (m, 4H, Aromatic ring H), 6.21 (m, 1H, Cyclopentadiene H), 6.10 (m, 1H, Cyclopentadiene H), 2.90 (m, 2H, Cyclopentadiene H), 2.65 (m, 2H, Aromatic ring H).

Example 26

5H-indeno [1,2-b] thiopyranyl as a Ligand Carbon Bridged Titanium Catalyst (1) Synthesis of 2-fluorocyclopentadienyl, prepared in the same manner as the step (1) in Example 19.

(2) 10 mmol of 5H-indeno [1,2-b] thiopyran was dissolved in 50 ml of diethyl ether and mixed with 10 mmol of n-butyllithium in 1.6 M hexane and stirred for several hours. Add equimolar 2-fluorocyclopentadienyl (supra) and the mixture was stirred overnight. The reaction mixture was then hydrolyzed in 50 ml of water, the organic phase was dried over sodium sulfate and the solvent was evaporated under vacuum.

(3) 20 mmol of 1,3,5-trifluorobenzene was dissolved in 50 mL of ether and cooled to −78° C. 20 mmol of butyllithium was added dropwise. After addition, 1 eq of titanium tetrachloride was added and the mixture was stirred overnight. A 10 mmol ligand was added dropwise to a mixture of 30 ml of ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 5H-indeno [1,2-b] thiopyran-2-fluorocyclopentadiene-di-1,3,5-trifluorophenyl-titanium dichloride. Feature: $^1$H NMR (DMSO d$^6$) δppm: 8.90 (m, 1H, Aromatic ring H), 8.35 (m, 1H, Aromatic ring H), 8.25 (m, 1H, Aromatic ring H), 8.00 (m, 1H, Aromatic ring H), 7.80 (m, 1H, Aromatic ring H), 7.55 (m, 1H, Aromatic ring H), 6.40 (m, 4H, Aromatic ring H), 6.21 (m, 1H, Cyclopentadiene H), 6.10 (m, 1H, Cyclopentadiene H), 2.90 (m, 2H, Cyclopentadiene H), 2.65 (m, 2H, Aromatic ring H).

Example 27

5H-indeno [1,2-b] thiopyranyl as a Ligand Carbon Bridged Hafnium Metal Catalyst (1) Synthesis of 2-fluorocyclopentadienyl, prepared in the same manner as the step (1) in Example 19.

(2) 10 mmol of 5H-indeno [1,2-b] thiopyran was dissolved in 50 ml of diethyl ether and mixed with 10 mmol of n-butyllithium in 1.6 M hexane and stirred for several hours. Add equimolar 2-fluorocyclopentadienyl (supra) and the mixture was stirred overnight. The reaction mixture was then hydrolyzed in 50 ml of water, the organic phase was dried over sodium sulfate and the solvent was evaporated under vacuum.

(3) 20 mmol of 1,3,5-trifluorobenzene was dissolved in 50 mL of diethyl ether and cooled to −78° C. 20 mmol of butyllithium was added dropwise. After adding 1 eq of hafnium tetrachloride, the mixture was stirred overnight, A 10 mmol ligand was added dropwise to a mixture of 30 ml of ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum.

For purification, the residue was dissolved in pentane and the solution was filtered through silica gel and crystallized at −30° C. to give the corresponding 5H-indeno [1,2-b] thiopyridin-2-fluorocyclopentadiene Ene-di-1,3,5-trifluorophenyl-hafnium dichloride. Feature: $^1$H NMR (DMSO d$^6$) 8.90 (m, 1H, Aromatic ring H), 8.35 (m, 1H, Aromatic ring H), 8.25 (m, 1H, Aromatic ring H), 8.00 (m, 1H, Aromatic ring H), 7.80 (m, 1H, Aromatic ring H), 7.55 (m, 1H, Aromatic ring H), 6.40 (m, 4H, Aromatic ring H), 6.21 (m, 1H, Cyclopentadiene H), 6.10 (m, 1H, Cyclopentadiene H), 2.90 (m, 2H, Cyclopentadiene H), 2.65 (m, 2H, Aromatic ring H).

Example 28

5H-indeno [1,2-b] thiopyranyl as a Ligand Silicon Bridged Zirconium Metal Catalyst (1) Synthesis of 2-fluorocyclopentadienyl: prepared in the same manner as the step (1) in Example 19.

(2) 5H-indeno [1,2-b] thiopyran was dissolved in 50 ml of diethyl ether and mixed with 10 mmol of n-butyllithium in 1.6 M hexane and then stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(3) 20 mmol of cyclohexylchlorosilane was dissolved in 50 mL of diethyl ether and cooled to −78° C. 20 mmol of butyllithium was added dropwise. After adding 1 eq of zirconium tetrachloride, the mixture was stirred overnight and then 10 mmol the mixture was dissolved in 30 ml of diethyl ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum.

For purification, the residue was dissolved in pentane and the solution was filtered through silica gel and crystallized at −30° C. to give the corresponding 5H-indeno [1,2-b] thiopyran-2-fluorocyclopentadiene-cyclohexylsilyl-zirconium dichloride.

Feature: $^1$H NMR (DMSO d$^6$) δppm: 8.90 (m, 1H, Aromatic ring H), 8.35 (m, 1H, Aromatic ring H), 8.25 (m, 1H, Aromatic ring H), 8.00 (m, 1H, Aromatic ring H), 7.80 (m, 1H, Aromatic ring H), 7.55 (m, 1H, Aromatic ring H), 6.21 (m, 1H, Cyclopentadiene H), 6.10 (m, 1H, Cyclopentadiene H), 2.90 (m, 2H, Cyclopentadiene H), 2.65 (m, 2H, Aromatic ring H), 2.60 (m, 2H, CH$_2$), 1.25 (m, 3H, CH$_3$), 0.85 (m, 10H, Cyclohexyl H).

Example 29

5H-indeno [1,2-b] thiopyranyl as a Ligand Silicon Bridged Titanium Catalyst (1) Synthesis of 2-fluorocyclopentadienyl: prepared in the same manner as the step (1) in Example 19.

(2) 5H-indeno [1,2-b] thiopyran was dissolved in 50 ml of diethyl ether and mixed with 10 mmol of n-butyllithium in 1.6 M hexane and then stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(3) 20 mmol of cyclohexylchlorosilane was dissolved in 50 mL of diethyl ether and cooled to −78° C. 20 mmol of butyllithium was added dropwise. After addition, 1 eq of titanium tetrachloride was added and the mixture was stirred overnight. The mixture was dissolved in 30 ml of diethyl ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum. For purification, the residue was dissolved in pentane and the solution was filtered through silica gel and crystallized at −30° C. to give the corresponding 5H-indeno [1,2-b] thiopyran-2-fluorocyclopentadiene-cyclohexylsilyl-titanium dichloride.

Feature: $^1$H NMR (DMSO d$^6$) δppm: 8.50 (m, 1H, Aromatic ring H), 7.95 (m, 1H, Aromatic ring H), 7.85 (m, 1H, Aromatic ring H), 7.60 (m, 1H, Aromatic ring H), 7.40 (m, 1H, Aromatic ring H), 7.15 (m, 1H, Aromatic ring H), 6.21 (m, 1H, Cyclopentadiene H), 6.10 (m, 1H, Cyclopentadiene H), 2.90 (m, 2H, Cyclopentadiene H), 2.65 (m, 2H, Aromatic ring H), 2.60 (m, 2H, CH$_2$), 1.25 (m, 3H, CH$_3$), 0.85 (m, 10H, Cyclohexyl H).

Example 30

5H-indeno [1,2-b] thiopyranyl as a Ligand Silicon Bridged Hafnium Metal Catalyst (1) Synthesis of 2-fluorocyclopentadienyl: prepared in the same manner as the step (1) in Example 19.

(2) 5H-indeno [1,2-b] thiopyran was dissolved in 50 ml of diethyl ether and mixed with 10 mmol of n-butyllithium in 1.6 M hexane and then stirred for several hours. Add equimolar substituted 2-fluorocyclopentadiene, and the mixture was stirred overnight. The reaction mixture was then hydrolyzed in 50 ml of water, the organic phase was dried over sodium sulfate and the solvent was evaporated under vacuum.

(3) 20 mmol of cyclohexylchlorosilane was dissolved in 50 mL of ether and cooled to −78° C. 20 mmol of butyllithium was added dropwise. After adding 1 eq of hafnium tetrachloride, the mixture was stirred overnight and then 10 mmol The mixture was dissolved in 30 ml of diethyl ether. After completion of the dropwise addition, the mixture was stirred overnight, then the solvent was distilled off and the residue was extracted with dichloromethane. The organic phases were combined, dried over sodium sulfate, filtered and the solvent was evaporated under vacuum.

For purification, the residue was dissolved in pentane and the solution was filtered through silica gel and crystallized at −30° C. to give the corresponding 5H-indeno [1,2-b] thiopyran-2-fluorocyclopentadiene-cyclohexylsilyl-hafnium dichloride. Feature: $^1$H NMR (DMSO d$^6$) δppm: 8.50 (m, 1H, Aromatic ring H), 7.95 (m, 1H, Aromatic ring H), 7.85 (m, 1H, Aromatic ring H), 7.60 (m, 1H, Aromatic ring H), 7.40 (m, 1H, Aromatic ring H), 7.15 (m, 1H, Aromatic ring H), 6.21 (m, 1H, Cyclopentadiene H), 6.10 (m, 1H, Cyclopentadiene H), 2.90 (m, 2H, Cyclopentadiene H), 2.65 (m, 2H, Aromatic ring H), 2.60 (m, 2H, CH$_2$), 1.25 (m, 3H, CH$_3$), 0.85 (m, 10H, Cyclohexyl H).

The foregoing detailed description of the objects, technical solutions and advantages of the invention has been made in detail, and it is to be understood that the foregoing is only a specific embodiment of the invention and is not intended to limit the invention, Any modifications, equivalent substitutions, improvements, and the like within the spirit and principles of the invention are intended to be included within the scope of the present invention.

Catalyst Activity Test:

Main Raw Materials and Their Pretreatment:

All operations involving the preparation and handling of metal organic compounds were carried out using standard glove boxes and Schlenk technology under high purity nitrogen. Solvent toluene, analytical grade, before use with sodium and benzophenone continuous reflux for 24 h or more until the discoloration after the distillation seal back. The 1-decene for the polymerization reaction was purchased from Aldrich and purified by water and an oxygen scavenger. Polymerization test with the vacuum bottle vacuum dehumidification, with high purity nitrogen replacement at least 3 to 4 times, nitrogen protection down temperature. Preparation of a certain concentration of the main catalyst and cocatalyst toluene solution. When the temperature of the oil bath reaches the set temperature, a dry glass syringe is used to add a certain amount of cocatalyst to the glass reaction flask. The toluene solution of 1-decene, toluene, master and auxiliary catalyst is added with stirring to keep the oil bath temperature, began to aggregate. After reaction for a certain period of time, the reaction was terminated with an ethanolic hydrochloric acid solution, and then the polymerization product was subjected to filtration separation. The supernatant product is added to the deionized water to be washed several times and then subjected to a liquid separation treatment. The unreacted monomer and the solvent are removed by vacuum distillation, and then the target product is obtained by distillation under reduced pressure at 90-160° C. The concentration of the catalyst component is as follows: Metallocene catalyst: 1% toluene solution; Main promoter: 0.1% Ph3C+B (C6F5) 4-in toluene; Auxiliary catalyst: 25% Al (iBu) 3 in toluene.

Three catalyst components: The metallocene catalyst/cocatalyst/co-catalyst has a molar ratio of 1:2:6.

Experimental Method:

The dried 50 ml of toluene and 1-decene (370 g, 2.64 mol) were added to a 500 ml reaction flask equipped with a magnetic stirrer.

When the temperature was raised to 50° C., 20 ml of the auxiliary catalyst solution (0.30 g, 1.00 mmol) was added and stirred for 30 minutes. (C6, F5) 4]—(0.18 g, 0.020 mmol) and the co-catalyst (iBu) 3Al (3) were prepared by the reaction of the catalyst catalyst (X, 0.010 mmol Zr), the main promoter [CPh3] 0.10 g, 0.50 mmol) was injected into the reaction flask to initiate the reaction, and the reaction was allowed to rise to 70° C. by heating to maintain a constant temperature reaction for 1 hour.

The reaction was then quenched by the addition of 5 ml of ethanolic hydrochloric acid solution. After removal of unreacted 1-decene and solvent toluene in vacuo, the weight of the remaining product was weighed and the catalytic activity and 1-decene conversion were calculated.

Sample 1: 5H-indeno [1,2-b] pyridyl-2-fluorocyclopentadienyl-bis-1,3,5-trifluorophenyl-zirconium dichloride;

Sample 2: 5H-indeno [1,2-b] pyridyl-2-fluorocyclopentadienyl-bis-1,3,5-trifluorophenyl-titanium dichloride;

Sample 3: 5H-indeno [1,2-b]pyridyl-2-fluorocyclopentadienyl-bis-1,3,5-trifluorophenyl-hafnium-dihalide;

Sample 4: 5H-indeno [1,2-b] pyridyl-2-fluorocyclopentadienyl-cyclohexylsilyl-zirconium dichloride;

Sample 5: 5H-indeno [1,2-b] pyridyl-2-fluorocyclopentadienyl-cyclohexylsilyl-titanium dichloride;

Sample 6: 5H-indeno [1,2-b] thiopyranyl-2-fluorocyclopentadienyl-bis-1,3,5-trifluorophenyl-zirconium dichloride;

Sample 7: 5H-indeno [1,2-b] thiopyranyl-2-fluorocyclopentadienyl-bis-1,3,5-trifluorophenyl-titanium dichloride;

Sample 8: 5H-indeno [1,2-b] thiopyranyl-2-fluorocyclopentadienyl-bis-1,3,5-trifluorophenyl-hafnium-dihalide;

Sample 9: 5H-indeno [1,2-b] thiopyranyl-2-fluorocyclopentadienyl-cyclohexylsilyl-zirconium dichloride;

Sample 10: 5H-indeno [1,2-b] thiopyranyl-2-fluorocyclopentadienyl-cyclohexylsilyl-titanium dichloride.

Summary of Experimental Results 1

|  | Experimental Sample | | | | | Control 1 | Control 2 | Method, ASTM |
| --- | --- | --- | --- | --- | --- | --- | --- | --- |
|  | 1 | 2 | 3 | 4 | 5 | | | |
| viscosity @ 100° C., cSt | 41 | 65.8 | 101 | 152 | 1050 | 39.7 | 107.2 | D445 |
| viscosity @ 40° C., cSt | 680 | 670 | 1067 | 1580 | 12500 | 386 | 1332 | D445 |
| Viscosity index | 201 | 199 | 250 | 286 | 350 | 152 | 173 | D2270 |
| Pour point, ° C. | −45 | −49 | −39 | −54 | −42 | −42 | −33 | D97 |

Summary of Experimental Results 2

|  | Experimental Sample | | | | | Control 3 | Control 4 | Methods, ASTM |
| --- | --- | --- | --- | --- | --- | --- | --- | --- |
|  | 6 | 7 | 8 | 9 | 10 | | | |
| viscosity @ 100° C., cSt | 39 | 64.8 | 98.5 | 168 | 1071 | 41 | 92 | D445 |
| viscosity @ 40° C., cSt | 590 | 617 | 987 | 1391 | 11080 | 325 | 814 | D445 |
| Viscosity index | 187 | 205 | 280 | 271 | 289 | 181 | 204 | D2270 |
| Pour point, ° C. | −47 | −39 | −43 | −55 | −41 | −42.5 | −37.5 | D97 |

In conclusion, As a catalyst, the metallocene compound is shown to be structurally stable and high in catalytic efficiency, and the preparation of the catalyst is relatively easy in operation, high in yield, low in cost, low in pollution and easy to scale up for industrial production.

The invention claimed is:

1. A metallocene compound, comprising a substituted aryl group, a bridged atom, a 3-mono-substituted or 3,6-disubstituted 5H-indeno [1,2-b] pyridyl group or 3 mono-substituted or 3,6-disubstituted 5H-indeno [1,2-b] thiopyranyl group, and a metal coordination group, and the catalyst has a formula of:

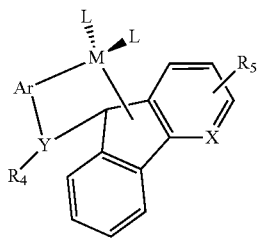

wherein:
the aryl group is

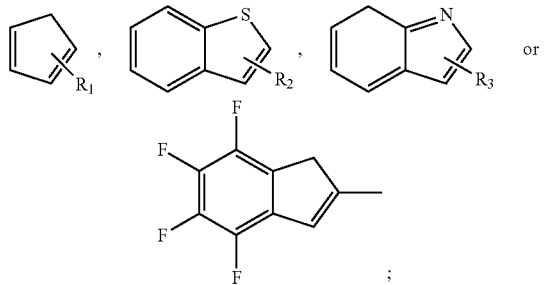

X is nitrogen or sulfur;
Y is silicon or carbon as a bridging atom;
$R_1$ is fluorine or hydrogen on cyclopentadienyl group;
$R_2$ is fluorine or hydrogen on benzothiophenyl group;
$R_3$ is fluorine or hydrogen on indoly group;
$R_4$ is a substituent on a bridge, being a cyclohexyl, cyclopentyl, or cyclobutyl when bridging atom is silicon, and being 1,3,5-trisubstituted or mono-substituted or di-substituted phenyl when the bridging atom is carbon;
$R_5$ is halogen, or a straight-chain or branched alkyl with 2 to 24 carbon atoms on 3-mono-substituted or 3,6-disubstituted 5H-indeno [1,2-b] pyridyl or 3-mono-substituted or 3,6-disubstituted 5H-indeno [1,2-b] thiopyranyl;
M is metal of zirconium, hafnium or titanium;
L is a halogen as a ligand coordinated to metal.

2. The metallocene compound of claim 1, wherein:
1) the 5H-indeno [1,2-b] pyridyl is selected from the group consisting of: 5H-indeno [1,2-b] pyridyl, 3-fluoro 5H-indeno [1,2-b] pyridyl, 3,6-dibromo-5H-indeno [1,2-b] pyridyl, 3-iodo-5H-indeno [1,2-b] pyridyl, 3,6-diiodo 5H-indeno [1,2-b] pyridyl, 3-ethyl 5H-indeno [1,2-b] pyridyl, 3,6-diethyl 5H-indeno [1,2-b] pyridyl, 3-propyl 5H-indeno [1,2-b] pyridyl, 3,6-dipropyl 5H-indeno [1,2-b] pyridyl, 3-butyl 5H-indeno [1,2-b] pyridyl, 3,6-dibutyl 5H-indeno [1,2-b] pyridyl, 3-isopropyl 5H-indeno [1,2-b] pyridyl, 3,6-diisopropyl 5H-indeno [1,2-b] pyridyl, 3-isobutyl 5H-indeno [1,2-b] pyridyl, 3,6-diisobutyl 5H-indeno [1,2-b] pyridyl, 3-pentyl 5H-indeno [1,2-b] pyridyl, 3,6-dipentyl 5H-indeno [1,2-b] pyridyl, 3-isopentyl 5H-indeno [1,2-b] pyridyl, 3,6-diisopentyl 5H-indeno [1,2-b] pyridyl, 3-tert-butyl 5H-indeno [1,2-b] pyridyl, 3,6-di-tert-butyl 5H-indeno [1,2-b] pyridyl, 3-hexyl 5H-indeno [1,2-b] pyridyl, 3,6-dihexyl 5H-indeno [1,2-b] pyridyl, 3-isohexyl 5H-indeno [1,2-b] pyridyl, 3,6-diisohexyl 5H-indeno [1,2-b] pyridyl, 3-tert-butyl ethyl 5H-indeno [1,2-b] pyridyl 3,6-di-t-butyl ethyl 5H-indeno [1,2-b] pyridyl, 3-heptyl 5H-indeno [1,2-b] pyridyl, 3,6-diheptyl 5H-indeno [1,2-b] pyridyl, 3-isoheptyl 5H-indeno [1,2-b] pyridyl, 3,6-diisoheptyl 5H-indeno [1,2-b] pyridyl, 3-tert-butyl propyl 5H-indeno [1,2-b] pyridyl, 3,6-di tert-butyl propyl 5H-indeno [1,2-b] pyridyl, 3-octyl 5H-indeno [1,2-b] pyridyl, 3,6-dioctyl 5H-indeno [1,2-b] pyridyl, 3-isooctyl 5H-indeno [1,2-b] pyridyl, 3,6-diisooctyl 5H-indeno [1,2-b] pyridyl, tert-butylbutyl-5H-indeno [1,2-b] pyridyl, 3,6-di-tert-butylbutyl 5H-indeno [1,2-b] pyridyl, 3-undecyl 5H-indeno [1,2-b] pyridyl, 3,6-di-undecyl 5H-indeno [1,2-b] pyridyl, 3-dodecyl 5H-indeno [1,2-b] pyridyl, 3,6-didodecyl 5H-indeno [1,2-b] pyridyl, 3-tridecyl 5H-indeno [1,2-b] pyridyl, 3,6-di-tridecyl 5H-indeno [1,2-b] pyridyl, 3-tetradecyl 5H-indeno [1,2-b] pyridyl, 3,6-ditetradecyl 5H-indeno [1,2-b] pyridyl, 3-pentadecyl 5H-indeno [1,2-b] pyridyl, 3,6-di-pentadecyl 5H-indeno [1,2-b] pyridyl, 3-hexadecyl 5H-indeno [1,2-b] pyridyl, 3,6-di-hexadecyl 5H-indeno [1,2-b] pyridyl, 3-heptadecyl 5I-indeno [1,2-b] pyridyl, 3,6-di-heptadecyl 5H-indeno [1,2-b] pyridyl, 3-octadecyl 5H-indeno [1,2-b] pyridyl, 3,6-di-octadecyl 5H-indeno [1,2-b] pyridyl, 3-n-hexadecyl 5-indeno [1,2-b] pyridyl, 3,6-di-n-hexadecyl 5H-indeno [1,2-b] pyridyl, 3-eicosyl 5H-indeno [1,2-b] pyridyl, 3,6-di-eicosyl 5H-indeno [1,2-b] pyridyl, 3-docosyl 5H-indeno [1,2-b] pyridyl, 3,5-di docosyl 5H-indeno [1,2-b] pyridyl, 3-dodecyl 5H-indeno [1,2-b] pyridyl, 3,6-di-dodecyl 5H-indeno [1,2-b] pyridyl, 3-tridecyl 5H-indeno [1,2-b] pyridyl, 3,6-di-trialkyl 5H-indeno [1,2-b] pyridyl, 3-tetracosyl 5H-indeno [1,2-b] pyridyl, 3,6-di-tetracosyl 5H-indeno [1,2-b] pyridyl;

2) the 5H-indeno [1,2-b] thiopyranyl is selected from the group consisting of: 5H-indeno [1,2-b] thiopyranyl, 3-fluoro-5H-indeno [1,2-b] thiopyranyl, 3,6-difluoro 5H-indeno [1,2-b] thiopyranyl, 3-bromo-5H-indeno [1,2-b] thiopyranyl, 3,6-dibromo-5H-indeno [1,2-b] thiopyranyl, 3-iodo-5H-indeno [1,2-b] thiopyranyl, 3,6-diiodo-5H-indeno [1,2-b] thiopyranyl, 3-ethyl 5H-indeno [1,2-b] thiopyranyl, 3,6-diethyl 5H-indeno [1,2-b] thiopyranyl, 3-propyl 5H-indeno [1,2-b] thiopyranyl, 3,6-dipropyl 5H-indeno [1,2-b] thiopyranyl, 3-butyl 5H-indeno [1,2-b] thiopyranyl, 3,6-dibutyl 5H-indeno [1,2-b] thiopyranyl, 3-isopropyl 5H-indeno [1,2-b] thiopyranyl, 3,6-diisopropyl 5H-indeno [1,2-b] thiopyranyl, 3-isobutyl 5H-indeno [1,2-b] thiopyranyl, 3,6-diisobutyl 5H-indeno [1,2-b] thiopyranyl, 3-pentyl 5H-indeno [1,2-b] thiopyranyl, 3,6-dipentyl 5H-indeno [1,2-b] thiopyranyl, 3-isopentyl 5H-indeno [1,2-b] thiopyranyl, 3,6-diisopentyl 5H-indeno [1,2-b] thiopyranyl, 3-tert-butyl 5H-indeno [1,2-b] thiopyranyl, 3,6-di-tert-butyl 5H-indeno [1,2-b] thiopyranyl, 3-hexyl 5H-indeno [1,2-b] thiopyranyl, 3,6-dihexyl 5H-indeno [1,2-b] thiopyranyl, 3-isohexyl 5H-indeno [1,2-b] thiopyranyl, 3,6-diisohexyl 5H-indeno [1,2-b] thiopyranyl, 3-tert-butylethyl 5H-indeno [1,2-b] thiopyranyl, 3,6-di-tert-butylethyl 5H-indeno [1,2-b] thiopyranyl, 3-heptyl 5H-indeno [1,2-b] thiopyranyl, 3,6-di-heptyl 5H-indeno [1,2-b] thiopyranyl, 3-isoheptyl 5H-indeno [1,2-b] thiopyranyl, 3,6-di-isoheptyl 5H-indeno [1,2-b] thiopyranyl, 3-tert-butylpropyl 5H-indeno [1,2-b] thiopyranyl, 3,6-di-tert-butylpropyl-5H-indeno [1,2-b] thiopyranyl, 3-octyl 5H-indeno [1,2-b] thiopyranyl, 3,6-dioctyl 5H-Indeno [1,2-b] thiopyranyl, 3-isooctyl 5H-indeno [1,2-b] thiopyranyl, 3,6-diisooctyl 5H-indeno [1,2-b] thiopyranyl, 3-tert-butylbutyl 5H-indeno [1,2-b] thiopyranyl, 3,6-di-tert-butylbutyl 5H-indeno [1,2-b] thiopyranyl, 3-undecyl 5H-indeno [1,2-b] thiopyranyl, 3,6-di-undecyl 5H-indeno [1,2-b] thiopyranyl, 3-dodecyl 5H-indeno [1,2-b] thiopyranyl, 3,6-di-dodecyl 5H-indeno [1,2-b] thiopyranyl, 3-tridecyl 5H-indeno [1,2-b] thiopyranyl, 3,6-di-tridecyl 5H-indeno [1,2-b] thiopyranyl, 3-tetradecyl 5H-indeno [1,2-b] thiopyranyl, 3,6-di-tetradecyl 5H-indeno [1,2-b] thiopyranyl, 3-pentadecyl 5H-indeno [1,2-b] thiopyranyl, 3,6-di-pentadecyl 5H-indeno [1,2-b] thiopyranyl, 3-hexadecyl 5H-indeno [1,2-b] thiopyranyl, 3,6-di-hexadecyl 5H-indeno [1,2-b] thiopyranyl, 3-heptadecyl 5H-indeno [1,2-b] thiopyranyl, 3,6-di-heptadecyl 5H-indeno [1,2-b] thiopyranyl, 3-octadecyl 5H-indeno [1,2-b] thiopyranyl, 3,6-di-octadecyl 5H-indeno [1,2-b] thiopyranyl, 3-nonadecyl 5H-indeno [1,2-b] thiopyranyl, 3,6-di-nonadecyl 5H-indeno [1,2-b] thiopyranyl, 3-eicosyl 5H-indeno [1,2-b] thiopyranyl, 3,6-di-eicosyl 5H-indeno [1,2-b] thiopyranyl, 3-heneicosyl 5H-indeno [1,2-b] thiopyranyl, 3,6-di-heneicosyl 5H-indeno [1,2-b] thiopyranyl, 3-docosyl 5H-indeno [1,2-b] thiopyranyl, 3,6-di-octadecyl 5H-indeno [1,2-b] thiopyranyl, 3-docosyl 5H-indeno [1,2-b] thiopyranyl, 3,6-di-docosyl 5H-indeno [1,2-b] thiopyranyl, 3-tridecyl 5H-indeno [1,2-b] thiopyranyl, 3,6-di-tridecyl 5H-indeno [1,2-b] thiopyranyl, 3-tetracosyl 5H-indeno [1,2-b] thiopyranyl, 3,6-di-tetracosyl 5H-indeno [1,2-b] thiopyranyl.

3. The compound of claim 1, comprising 5H-indeno [1,2-b] pyridyl group, wherein the metallocene compound is selected from the group consisting of:

5H-indeno [1,2-b] pyridyl-2-fluorocyclopentadienyl-bis-1,3,5-trifluorophenyl-zirconium dichloride;

5H-indeno [1,2-b] pyridyl-2-fluorocyclopentadienyl-bis-1,3,5-trifluorophenyl-titanium dichloride;

5H-indeno[1,2-b]pyridyl-2-fluorocyclopentadienyl-bis-1,3,5-trifluorophenyl-hafnium-di halide;

5H-indeno [1,2-b] pyridyl-2-fluorocyclopentadienyl-cyclohexylsilyl-zirconium dichloride;

5H-indeno [1,2-b] pyridyl-2-fluorocyclopentadienyl-cyclohexylsilyl-titanium dichloride; and 5H-indeno [1,2-b] pyridyl-2-fluorocyclopentadienyl-cyclohexylsilyl-hafnium dichloride.

4. The metallocene compound of claim 1, comprising 5H-indeno [1,2-b] thiopyranyl group, wherein the metallocene compound is selected from the group consisting of:

5H-indeno [1,2-b] thiopyranyl-2-fluorocyclopentadienyl-bis-1,3,5-trifluorophenyl-zirconium dichloride;

5H-indeno [1,2-b] thiopyranyl-2-fluorocyclopentadienyl-bis-1,3,5-trifluorophenyl-titanium dichloride;

5H-indeno[1,2-b] thiopyranyl-2-fluorocyclopentadienyl-bis-1,3,5-trifluorophenyl-hafnium-dihalide;

5H-indeno [1,2-b] thiopyranyl-2-fluorocyclopentadienyl-cyclohexylsilyl-zirconium dichloride;

5H-indeno [1,2-b] thiopyranyl-2-fluorocyclopentadienyl-cyclohexylsilyl-titanium dichloride; and 5H-indeno [1,2-b] thiopyranyl-2-fluorocyclopentadienyl-cyclohexylsilyl-hafnium dichloride.

\* \* \* \* \*